United States Patent [19]
Rockwell et al.

[11] Patent Number: 5,479,599
[45] Date of Patent: Dec. 26, 1995

[54] COMPUTER CONSOLE WITH GROUP ICON CONTROL

[75] Inventors: Sammy L. Rockwell, Owego; Kurt N. Schroeder; Scott A. Sylvester, both of Endicott, all of N.Y.

[73] Assignee: International Business Machines Corporation, Armonk, N.Y.

[21] Appl. No.: 54,509

[22] Filed: Apr. 26, 1993

[51] Int. Cl.⁶ .................................................. G06F 3/14
[52] U.S. Cl. ........................ 395/155; 395/161; 395/159
[58] Field of Search ................................. 395/155, 157, 395/158, 159, 163, 161

[56] References Cited

U.S. PATENT DOCUMENTS

| | | | |
|---|---|---|---|
| 4,723,211 | 2/1988 | Barker et al. | 364/300 |
| 4,815,029 | 3/1989 | Barker et al. | 364/900 |
| 4,964,065 | 10/1990 | Hicks et al. | 364/514 |
| 4,965,717 | 10/1990 | Cutts, Jr. et al. | 364/200 |
| 5,025,395 | 6/1991 | Nose et al. | 364/518 |
| 5,040,131 | 8/1991 | Torres | 364/521 |
| 5,041,992 | 8/1991 | Cunningham et al. | 364/200 |
| 5,065,347 | 11/1991 | Pajak et al. | 395/159 |
| 5,140,677 | 8/1992 | Fleming et al. | 395/159 |
| 5,142,628 | 8/1992 | Okochi et al. | 395/325 |
| 5,233,688 | 8/1993 | Too | 395/161 |
| 5,261,044 | 11/1993 | Dev et al. | 395/159 |
| 5,276,789 | 1/1994 | Besaw et al. | 395/161 X |
| 5,287,447 | 2/1994 | Miller et al. | 395/159 X |
| 5,293,476 | 3/1994 | Wolber et al. | 395/159 X |

FOREIGN PATENT DOCUMENTS

| | | | |
|---|---|---|---|
| 63-106843 | 5/1988 | Japan | G06F 11/32 |
| 03105432 | 5/1991 | Japan | G06F 11/30 |
| 03150643 | 6/1991 | Japan | G06F 11/32 |
| 0484233 | 3/1992 | Japan | G06F 11/32 |
| 2076260 | 11/1981 | United Kingdom | H04L 11/12 |

OTHER PUBLICATIONS

Michael D. Millikin (Proteon, Platforms for the '90s) 1989, pp. 1–11.
Research Disclosure No. 305, Sep. 1989, "Animated Action Upon Multiple Objects", R. J. Torres.
IBM Technical Disclosure Bulletin vol. 34, No. 5, Oct. 1991, "Spatial User Interface", B. H. Berger et al., pp. 24–26.

Primary Examiner—Mark K. Zimmerman
Assistant Examiner—Cliff Nguyen Vo
Attorney, Agent, or Firm—Arthur J. Samdoovitz

[57] ABSTRACT

A console operates a computer which includes a multiplicity of processors. The console displays an activate icon, a grouping icon and a multiplicity of icons which represent the multiplicity of processors, respectively. The console supports the definition of a group of the processors based on user selection of two or more of the processor icons and the grouping icon. In response to the definition, the console displays a group icon which represents the selected processors. The console also supports activation of the group of processors by selecting the group icon and the activate icon. After the group of processors is activated, the console can still display the group icon. Thus, further action can be taken on the group as a whole without redefining the group. A second group of processors containing one or more of the processors of the first group and one or more other processors can also be defined as described above. The console displays both group icons. If an attempt is made to activate the first group of processors using the corresponding group icon and the activate icon, and one of the processors which is shared by both groups fails to activate, then the console modifies the display of both group icons to indicate that at least one processor in each of the groups has failed.

10 Claims, 23 Drawing Sheets

COMPUTER CONSOLE WITH GROUP ICON CONTROL

BACKGROUND OF THE INVENTION

The invention relates generally to computer systems and deals more particularly with a computer console for operating a computer system which has multiple processors.

Most computers require some type of console for operation. The console presents an interface by which the user can interact with the computer. For example, by means of the console, a user of an IBM System/370 or ES/9000 computer can request activation or deactivation of the computer. "Activation" comprises power-on, initial microcode load (IML) and initial program load (IPL), and "deactivation" comprises the opposite steps in reverse order.

Various types of console user interfaces were previously known. The most common type comprises a series of menu screens by which the operator selects objects to be acted upon and appropriate actions. For example, in the System/370 computer system, a menu screen early in the series lists the sole processor and various logical partitions of the computer and prompts the user to select either the processor or one of logical partitions. A next menu screen lists various operations such as power-on, IML and IPL and prompts the user to select one of the operations to perform on the object selected in the previous screen. This type of menu interface has proven cumbersome. Also, the user may forget what processor or logical partition was selected in the earlier menu screen when selecting an action from the subsequent menu screen.

A subsequently developed (but still prior art) console user interface for the ES/9000 computer comprises an object action format. A screen simultaneously displays an identification of a single processor computer, a status field and a plurality of action selection categories including an action selection category used to operate the computer. When the operator desires to activate the computer, the operator selects the operate action selection category, and in response, the console displays a "pull down" bar (over the identification of the processor) comprising a list of various available actions. Then, the operator selects an activate action from the list, and the console responds by activating the computer. Because the identification of the computer is displayed at the time that the operator selects the operate action selection category, the operator is more likely to remember what objects will be affected by the subsequent activate selection than with the menu interface of the System/370 computer system. Despite the advantages of the object action format, this prior art ES/9000 console user interface was limited to controlling a single processor, and improvements are necessary to control and monitor a multiple processor computer in an efficient manner.

In this prior art ES/9000 computer system, an operator defines and individually activates logical partitions of the computer as follows. The console displays and the operator selects a "customize" action category. In response, the console displays a list of customization actions (eg. "Activation Parameters", "Set Time and Date", etc.). The, the operator selects Activation Parameters. In response, the console program displays a list of types of Activation Parameter files (eg. Reset, Image, and Load). The operator selects "Image". In response, the console program displays a list of components of the computer (i.e. hardware components). Then, the operator selects a logical partition name and all the components that make up the logical partition. In response, the console links the selected components to the logical partition name. This process can be repeated to define additional logical partitions, each with a nonoverlapping set of components. Subsequently, the console displays a list of the logical partition names as well as the computer name. Then, the operator can select one of the logical partitions and, using the object/action format, an action to be performed on the components of the logical partition. While this prior art console accommodated sets of components in user defined logical partitions of the computer system, the sets could not overlap each other.

If a problem arises during activation of the prior art ES/9000 computer, then the console displays "exceptions" as the status of the computer. Then, to determine which component failed, the operator selects an action category to display the components of the computer and the status of each component. For example, the computer comprises multiple channels, and if one of the channels fails to activate, the console will display the status of that channel as failed to operate but display the status of the other channels as operating (assuming no other failures). If a problem arises during activation of one of the logical partitions, then the console displays the status of that partion as failed to operate but displays the status of other partions as operating.

A general object of the present invention is to provide a computer console with expanded, efficient and more user friendly characteristics for activating, deactivating and displaying status of a multiprocessor computer.

SUMMARY OF THE INVENTION

The invention resides in a console for operating a computer which includes a multiplicity of processors. The console displays an activate icon, a grouping icon and a multiplicity of icons which represent the multiplicity of processors, respectively. The console supports the definition of a group of the processors based on user selection of two or more of the processor icons and the grouping icon. In response to the definition, the console displays a group icon which represents the selected processors. The console also supports activation of the group of processors by selecting the group icon and the activate icon. After the group of processors is activated, the console can still display the group icon. Thus, further action can be taken on the group as a whole without redefining the group.

According to one feature of the invention, a second group of processors containing one or more of the processors of the first group and one or more other processors can be defined as described above. The console displays both group icons. If an attempt is made to activate the first group of processors using the corresponding group icon and the activate icon, and one of the processors which is shared by both groups fails to activate, then the console modifies the display of both group icons to indicate that at least one processor in each of the groups has failed.

DETAILED DESCRIPTION OF THE PREFERRED EMBODIMENTS

Figure 1:
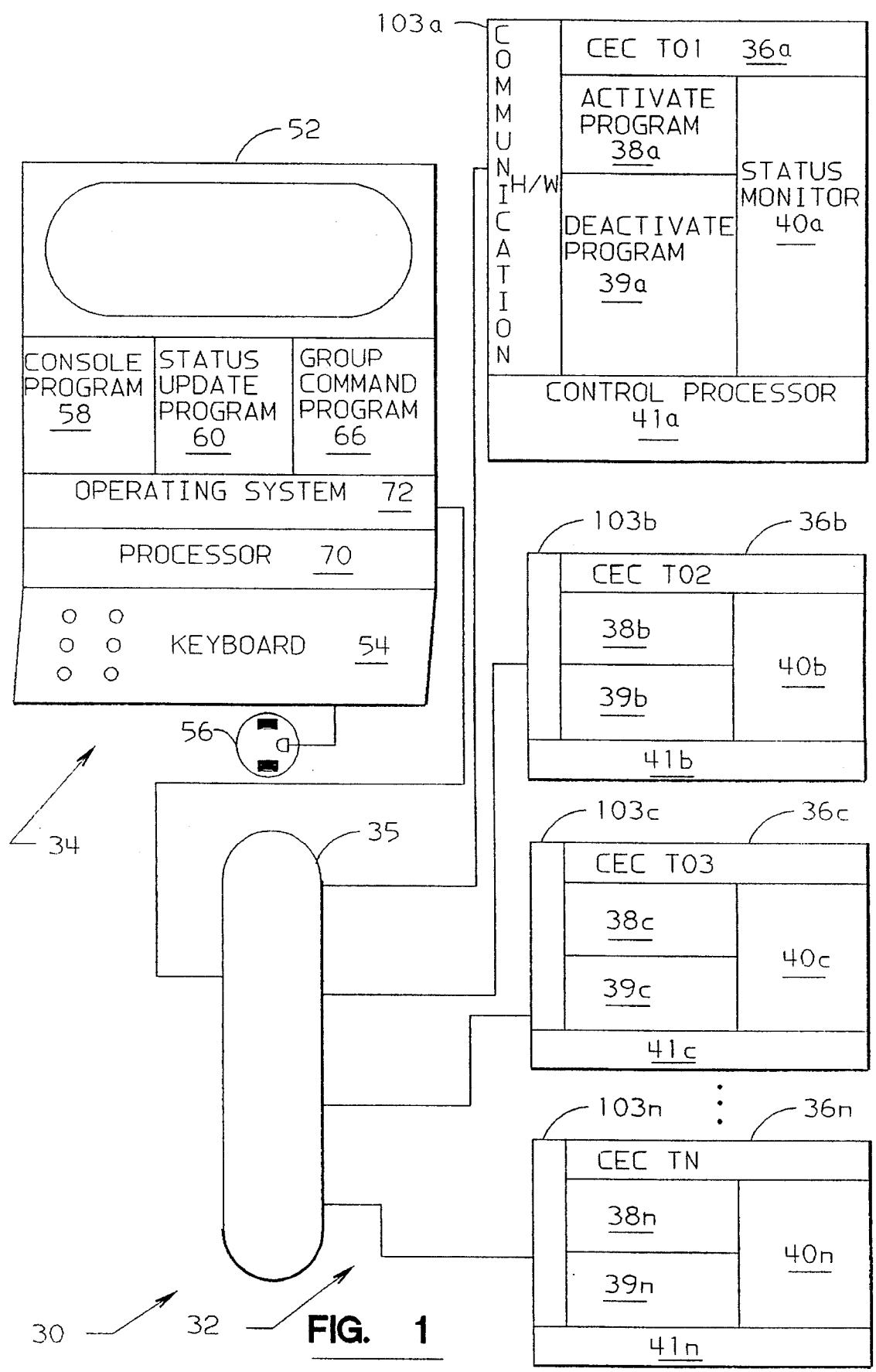
FIG. 1 is a block diagram of a computer system which includes the present invention.

Referring now to the drawings in detail wherein like reference numbers indicate like elements throughout the several views, FIG. 1 illustrates a computer system generally designated 30 according to the present invention. System 30 comprises a computer 32 having multiple processors or central electronic complexes (CECs) 36a,b,c,n a console 34 and a network 35 which interconnects CECs 36a,b,c,n with each other and the console. By way of example, the network 35 comprises either a Token Ring network or local area network. Processor 41a,b,c,n such as an IBM PS/2 processor accompany and control CEC s 36a,b,c,n, respectively. Activate functions 38a,b,c,n, deactivate function 39a,b,c,n and status monitor function 40a,b,c,n are execute on the control processors 41a,b,c,n, respectively. As described in more detail below, the console signals the activate function to activate the respective CEC according to user defined activation profiles. The console can also signal the status monitor function to determine and report the status of the respective CEC, for example, whether the CEC is in fact activated. The console can subsequently signal the deactivate function within the CECs to deactivate the respective CEC.

Console 34 comprises a display screen 52, a keyboard 54, a mouse 56, a console program 58, a status update program 60 and a group command program 66. Console 34 also comprises a previously known operating system 72 for controlling execution of programs 58, 60 and 66, and a previously known processor 70 for executing programs 58, 60, 66 and 72. By way of example, the hardware and operating system of console 34 are provided by an IBM PS/2 computer and an OS/2 operating system. As described in more detail below, the console program presents various display screens including status data to the user and receives user selections and commands (via the keyboard 54 and/or mouse 56). The group command program 66 receives activate and deactivate (and other) commands from the user, and signals the corresponding activate functions 38a,b,c,n or deactivate functions 39a,b,c,n to perform the requested action. The status update program 60 signals the status monitor functions 40a,b,c,n at the control processors 41a,b,c,n to determine and report status, and then supplies data for the console program to update the display screens with the current status.

Figure 2A:
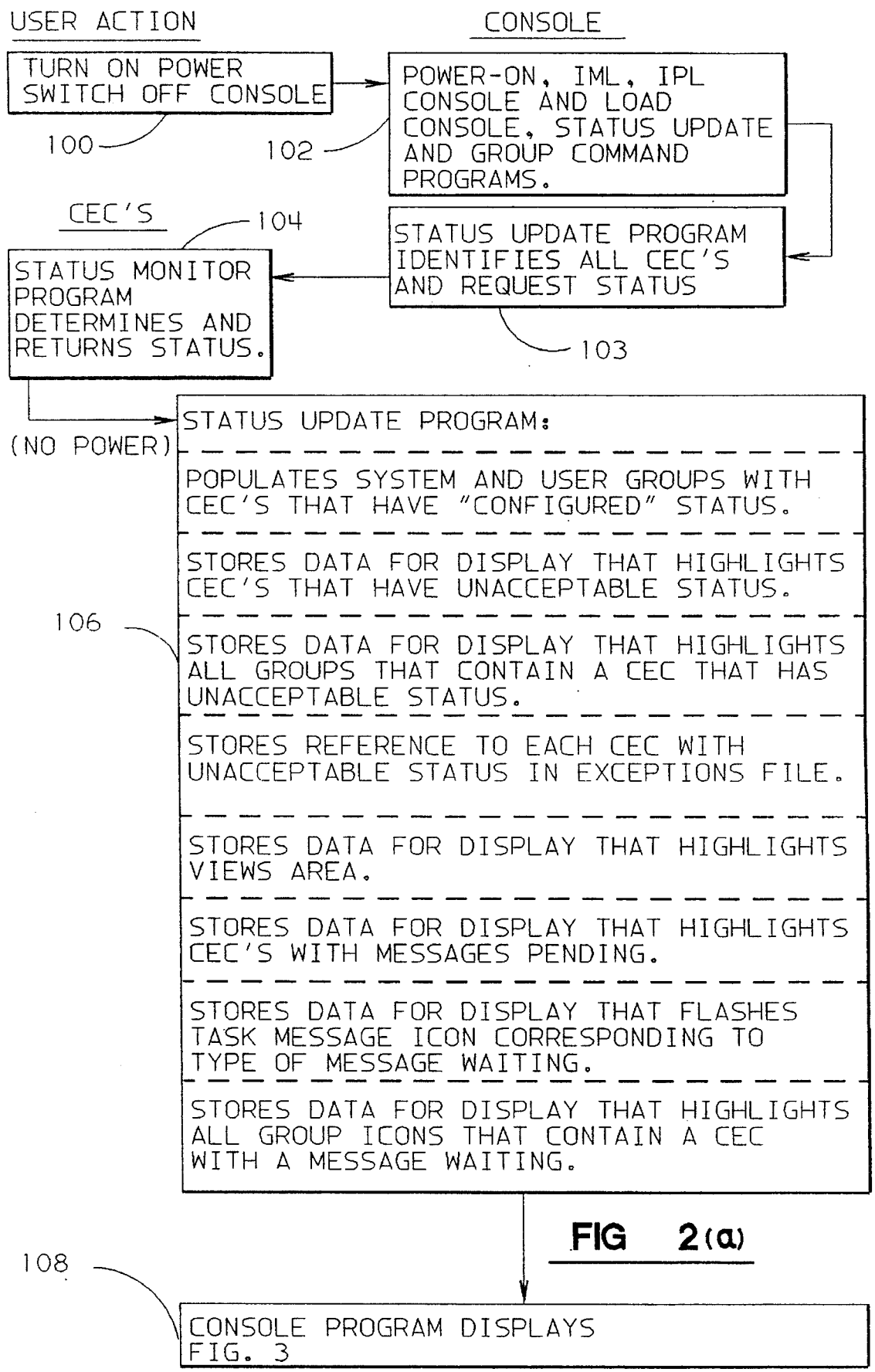
FIGS. 2(a–k) form a flow chart which illustrates operation of a console and central electronic complexes of the computer system of FIG. 1 in response to user inputs.
Figure 2B:
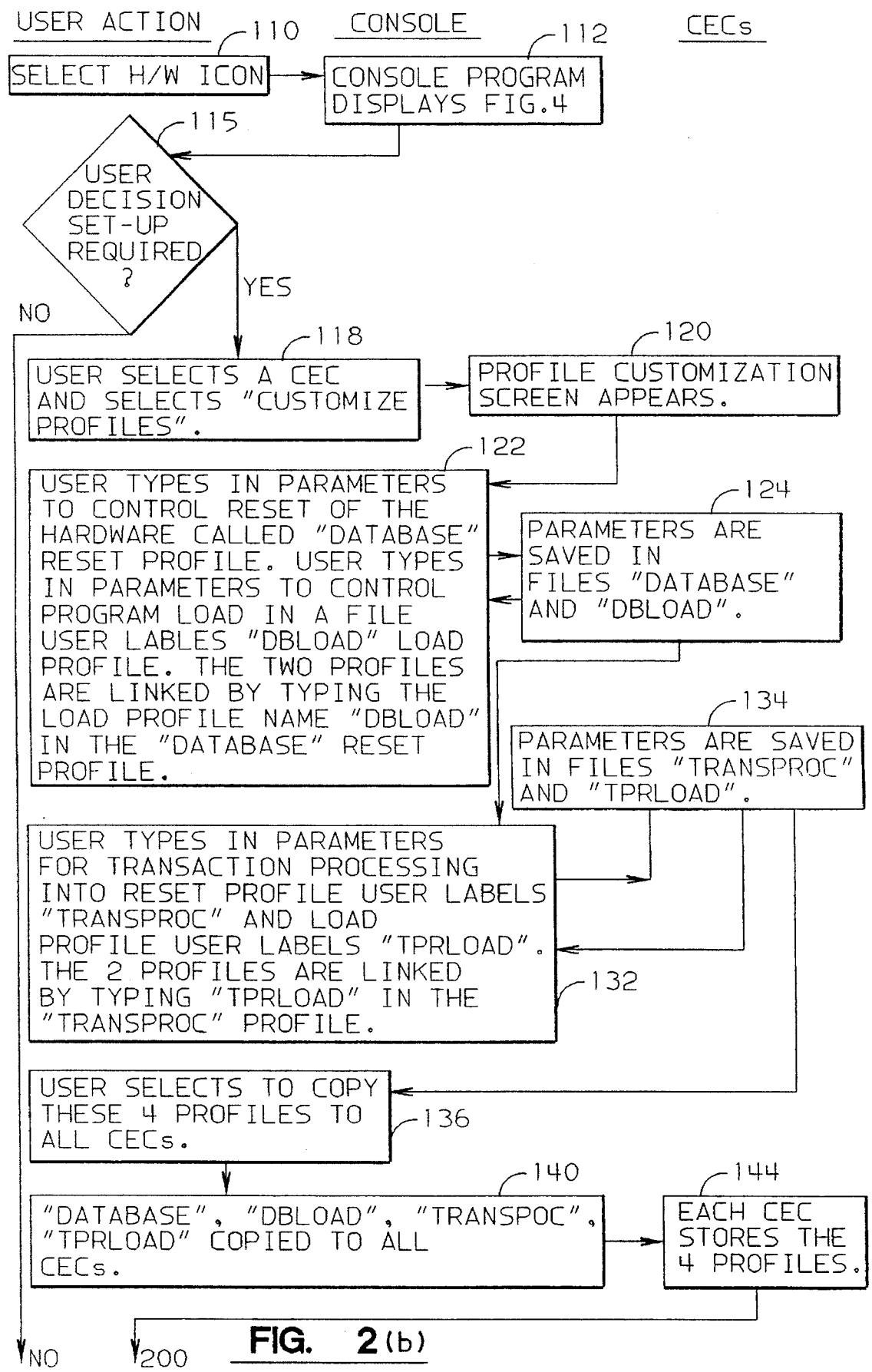
Figure 2C:
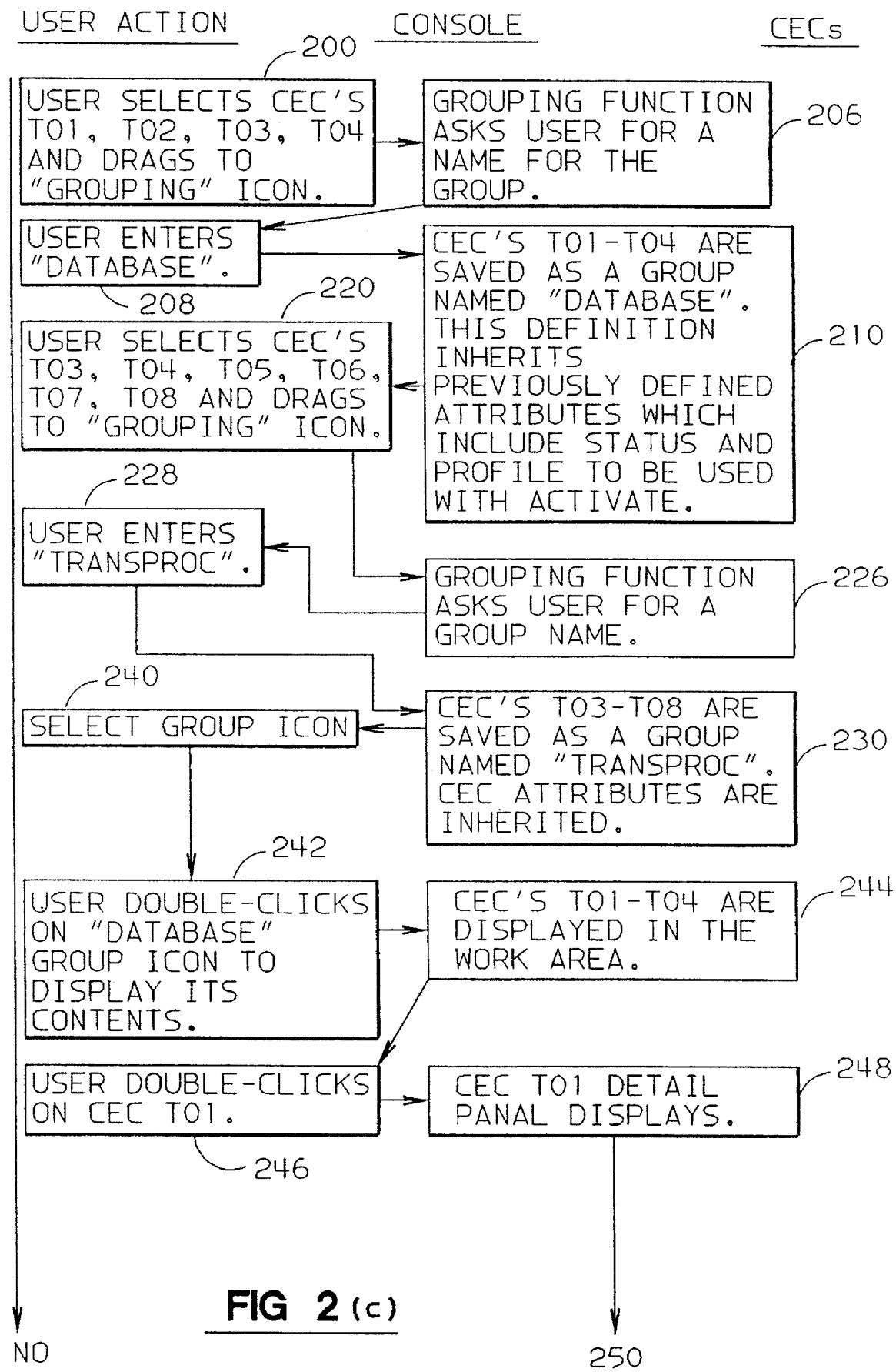
Figure 2D:
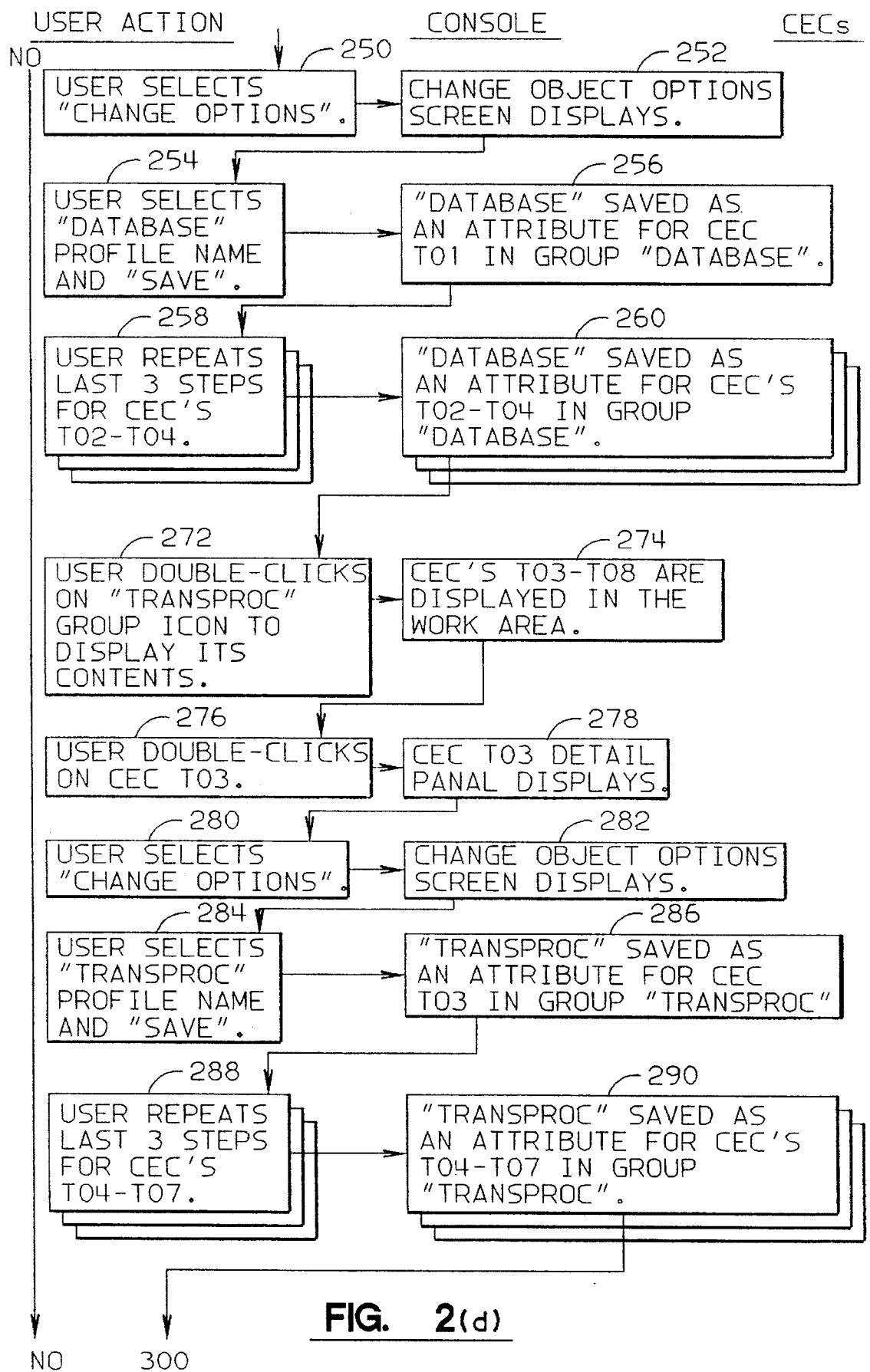
Figure 2E:
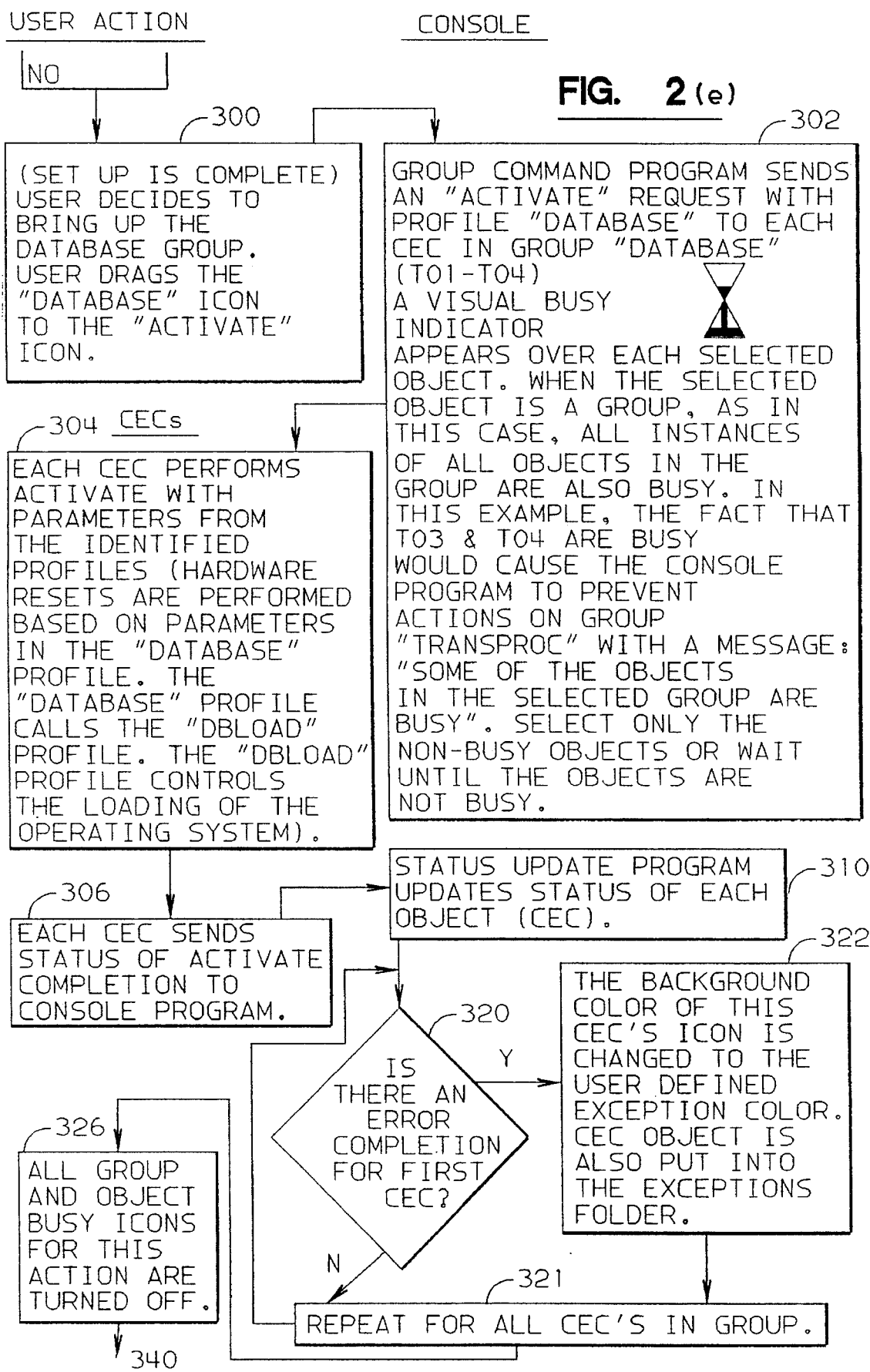
Figure 2F:
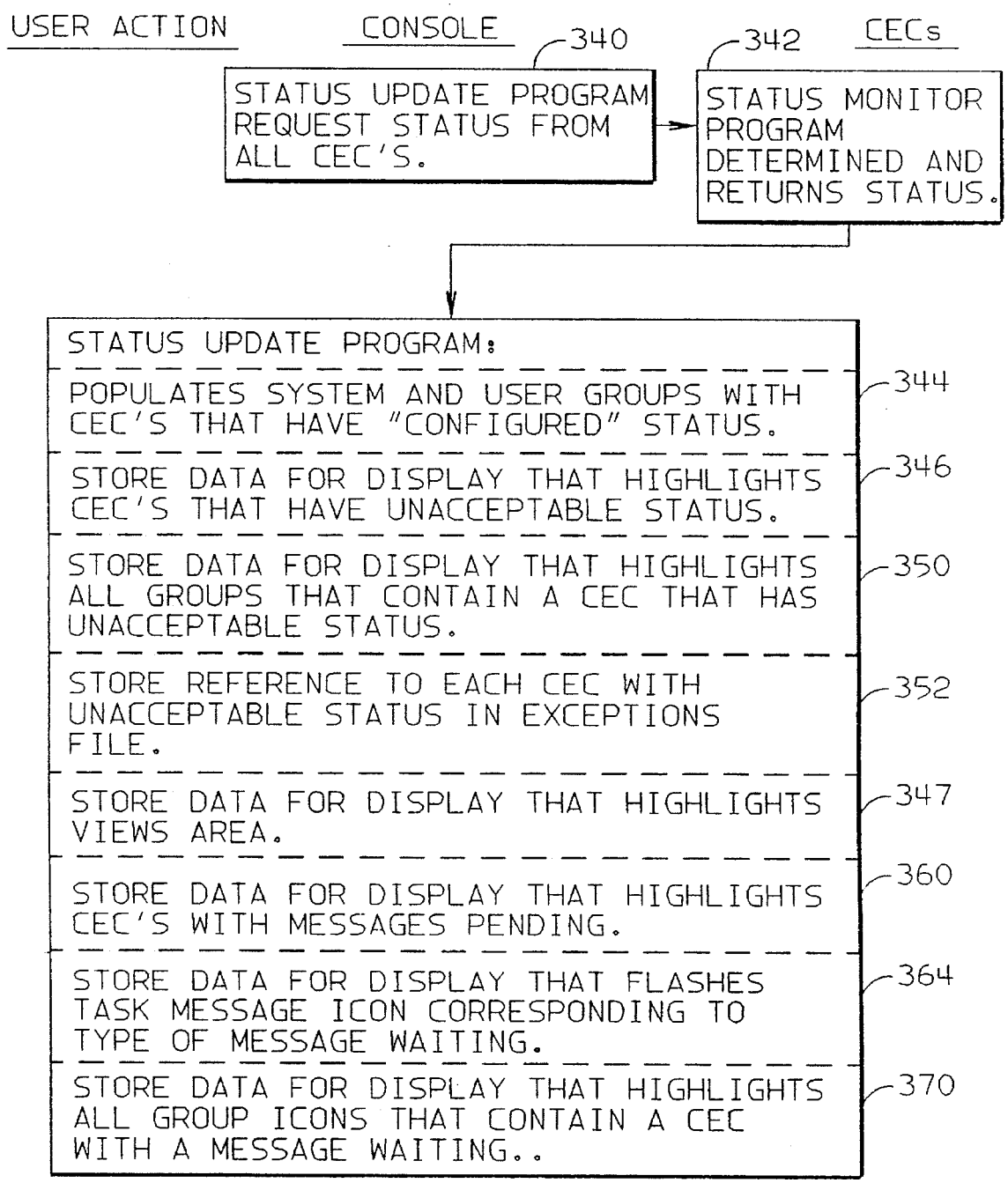
Figure 2G:
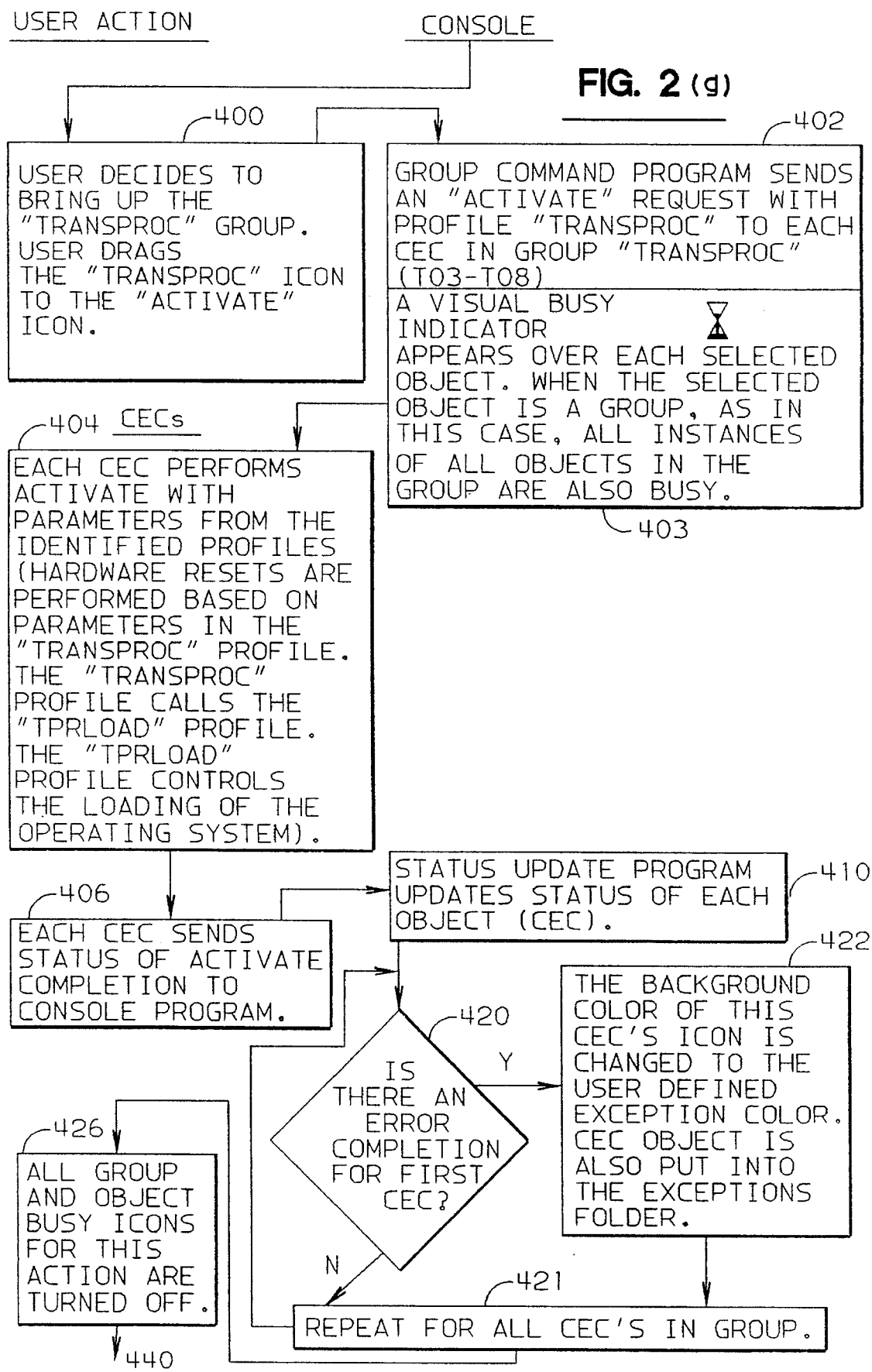
Figure 2H:
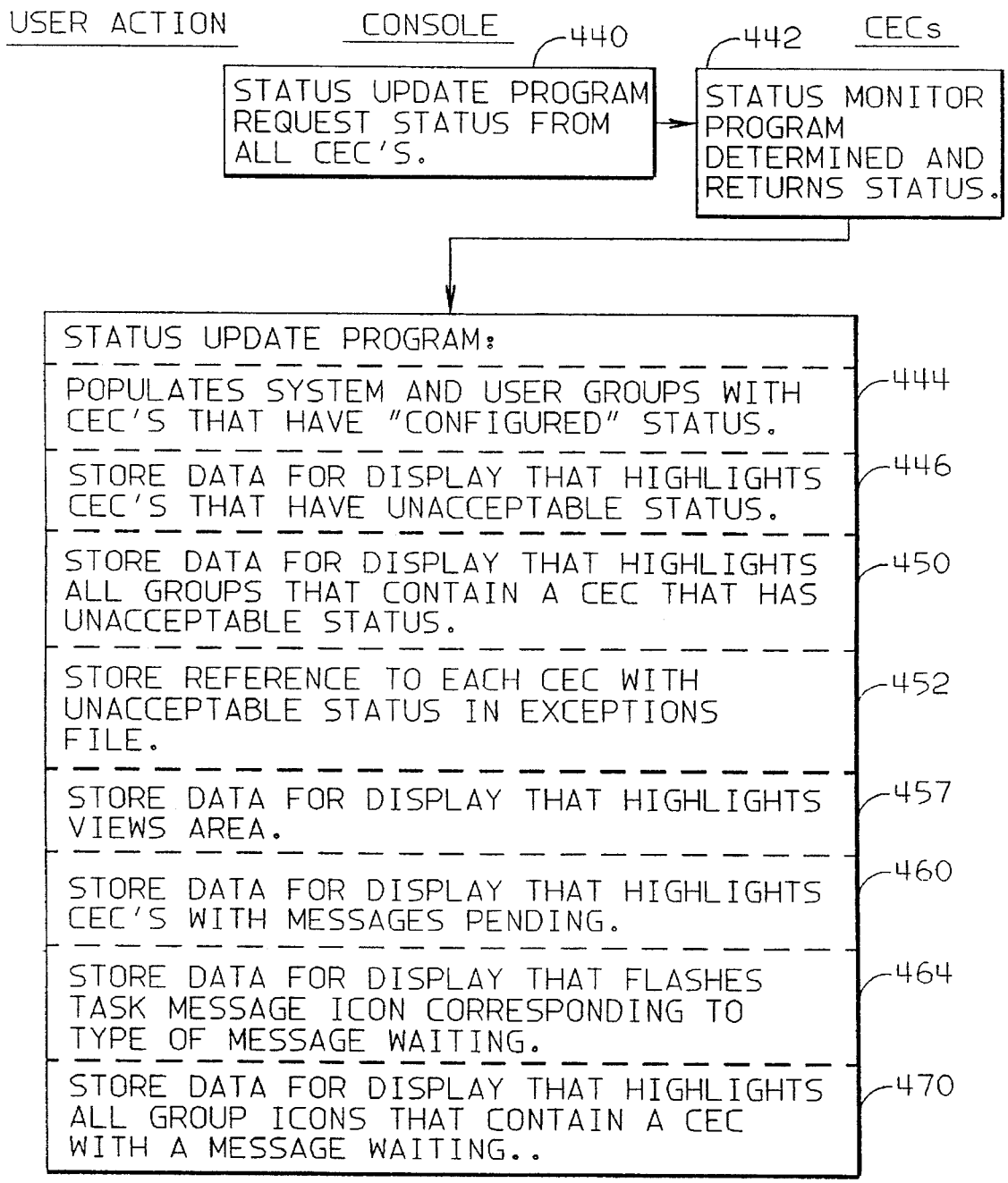
Figure 2:
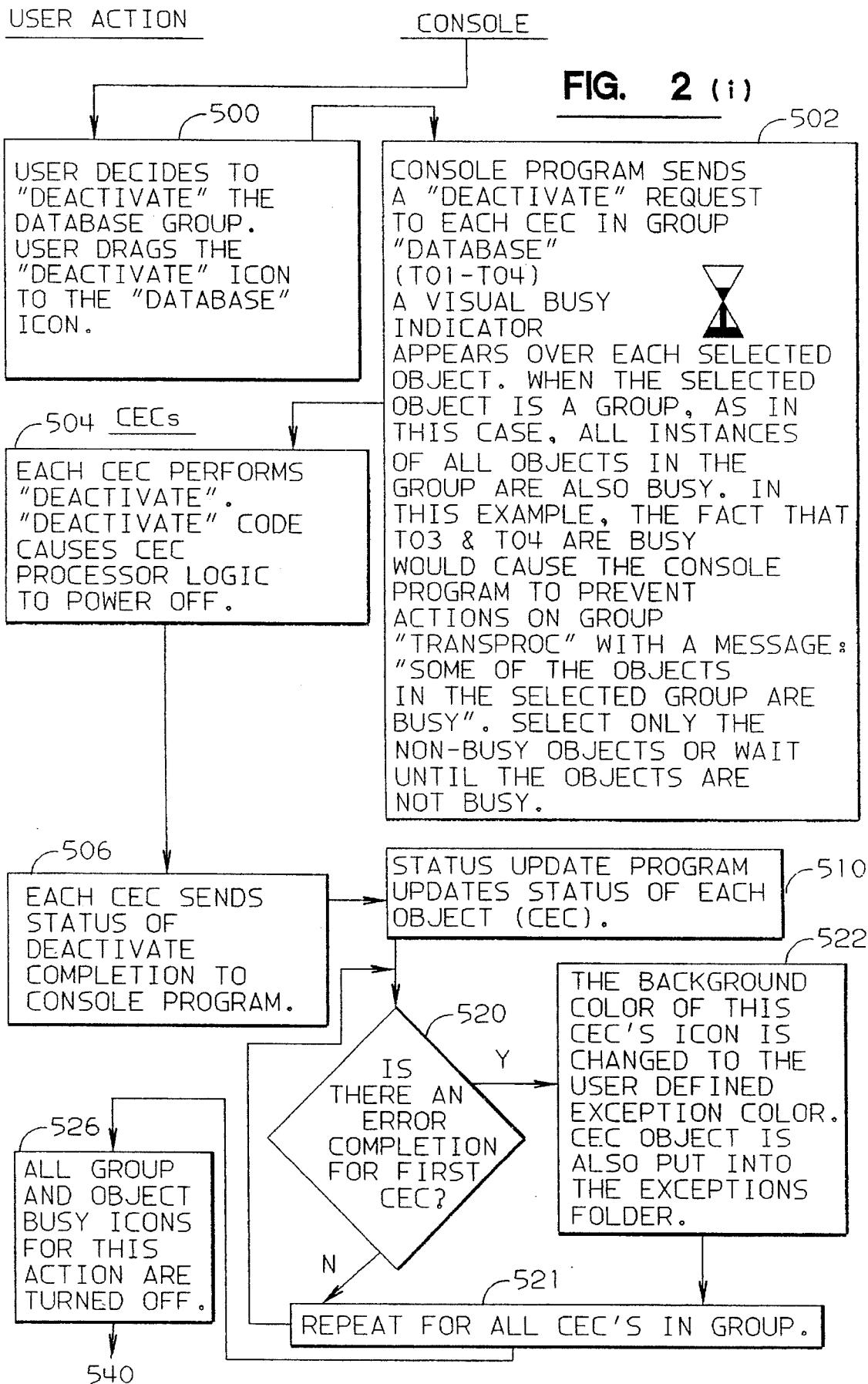
Figure 2J:
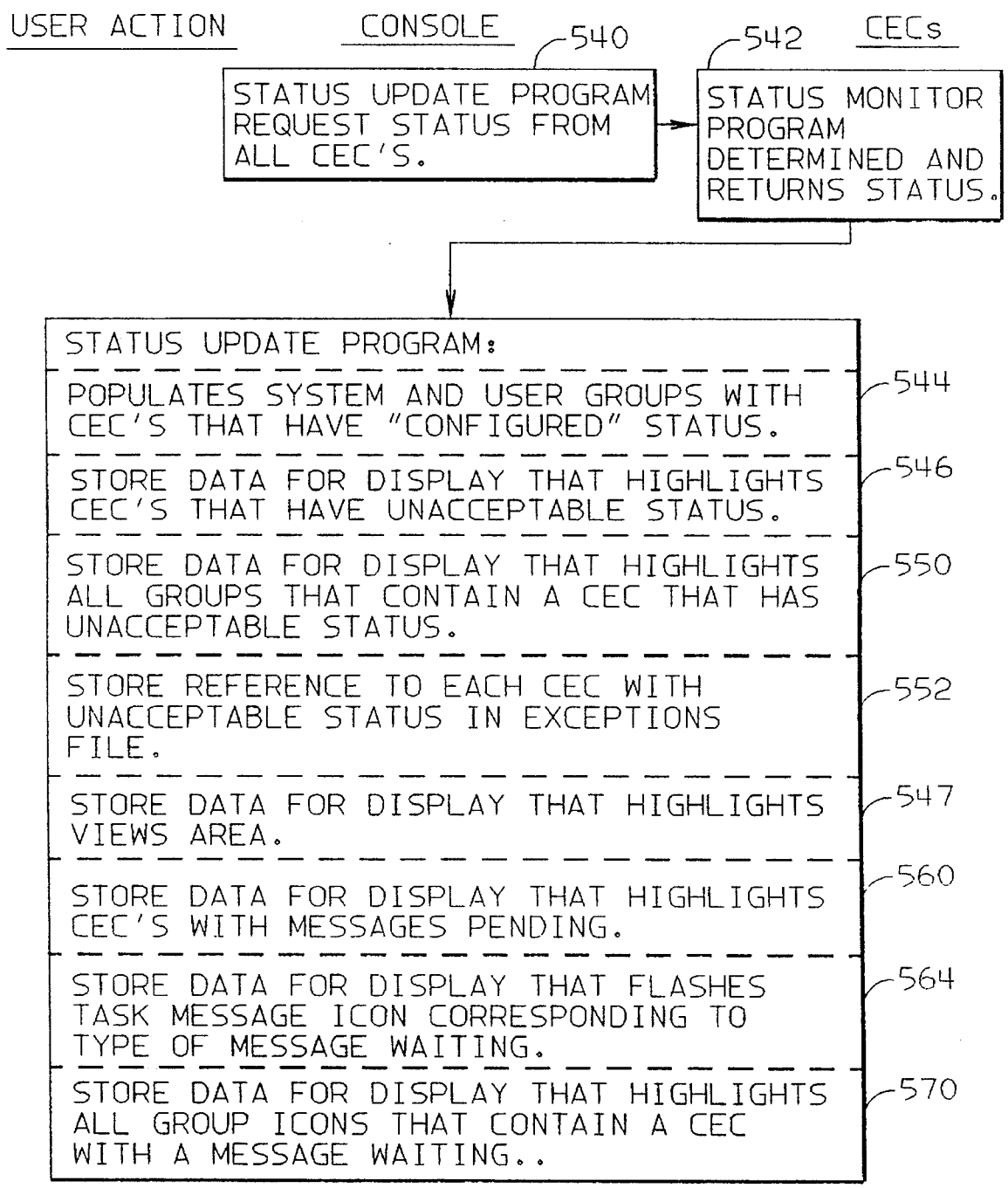
Figure 2K:
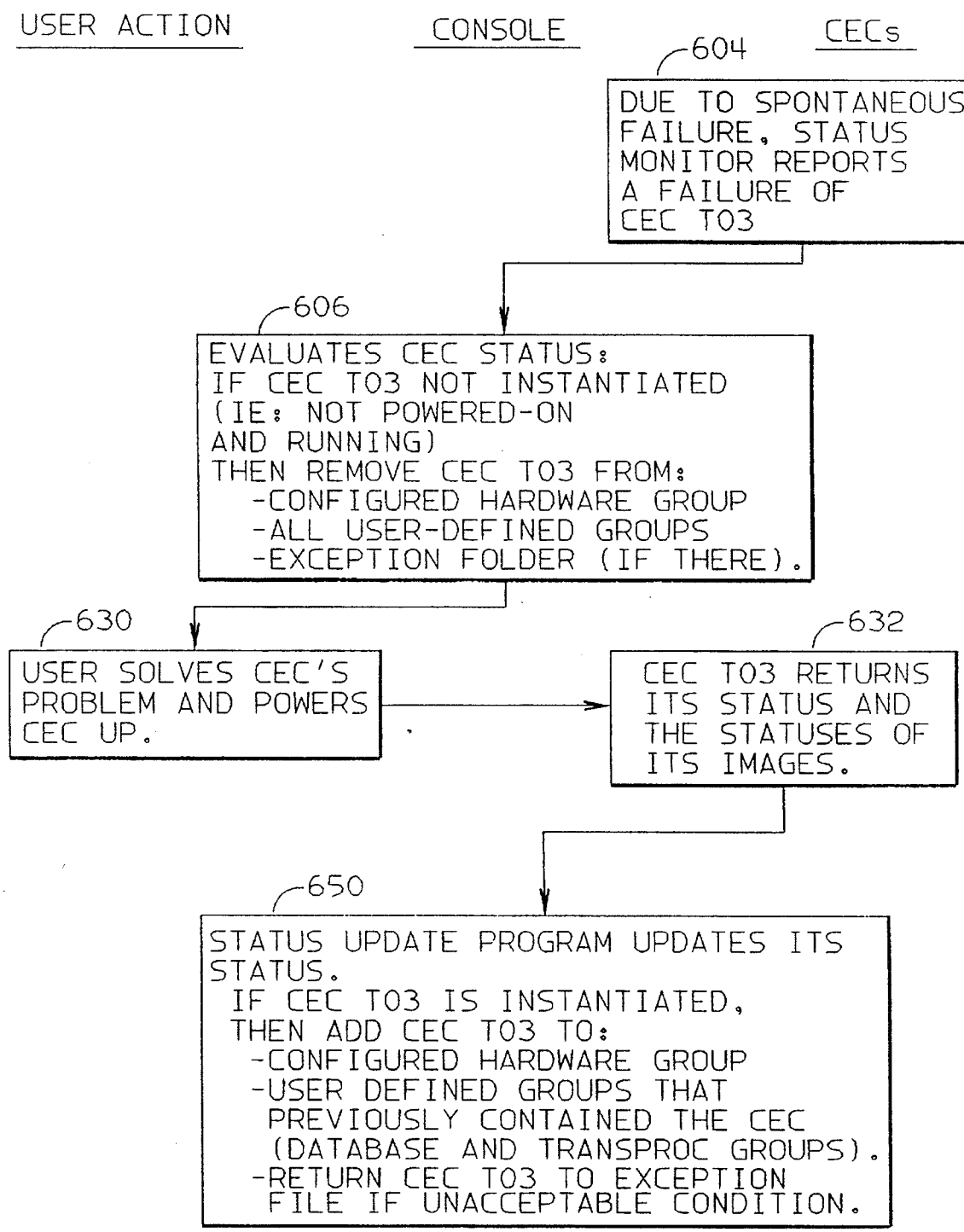
Figure 3:
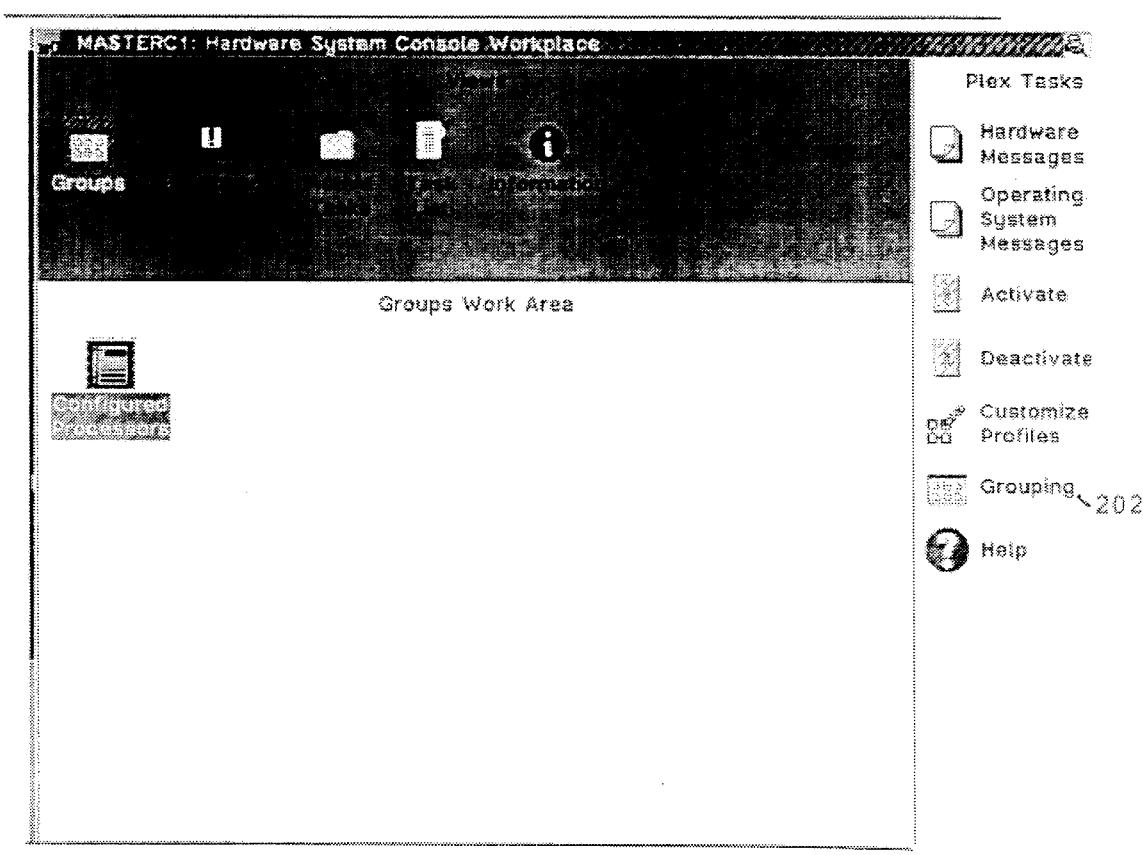
FIGS. 3–16 illustrate various screens displayed by the console of FIG. 1 during operation of the central electronic complexes of FIG. 1.

FIGS. 2(a–h) illustrate the process of defining, activating and deactivating groups of CECs and displaying failure and busy status. In step 100, the user turns-on a power switch for the console 34. In response, the programs 58, 60 and 66 are loaded, and the console program displays the screen of FIG. 3 (step 102). This screen illustrates a system defined Hardware icon which represents all the CECs 36a,b,c,n, (also named CECs T01–T02, T03, T04), and other system defined object and action icons at the top of the screen in the shaded "Views" area and along the right of the screen in the clear "Plex Tasks" area. Then the status update program 60 requests each control processor 41a,b,c,n to determine and report the status of the respective CEC (step 103). At this point assume that none of the CECs is active but all are functional and no messages are pending. The status monitor programs respond to the request with a "no power" status via communications hardware 103a,b,c,n (step 104). In response, the status update program records that all of the CECs T01–T32 are functional but not yet powered on (step 106). FIG. 2(a) also lists other steps within and below the box of step 106 that the status update program can perform depending on the returned status. However, at this time, none of the CECs is grouped with any of the other CECs, so that status program does not populate any user groups. Also, because none of the CECs is in a failure mode, is busy or has messages waiting, the console program does not display any indication of these events.

Figure 4:
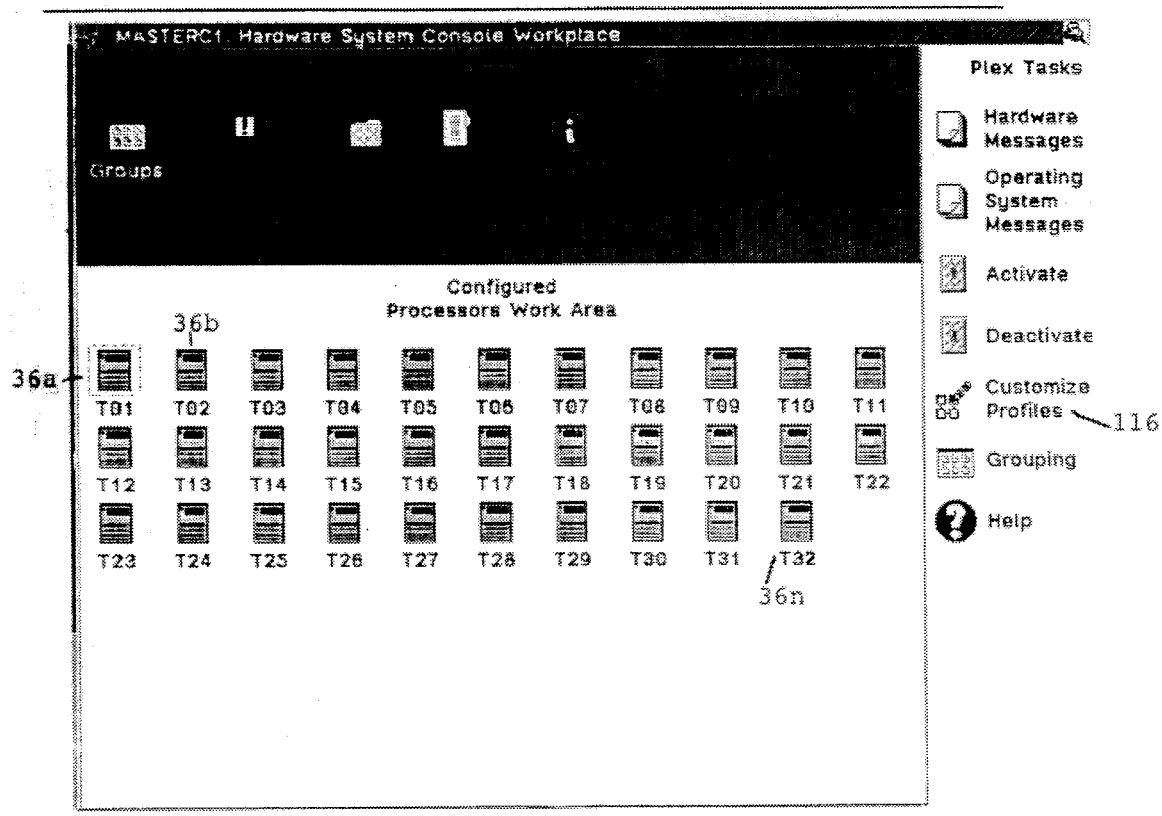
Figure 5:
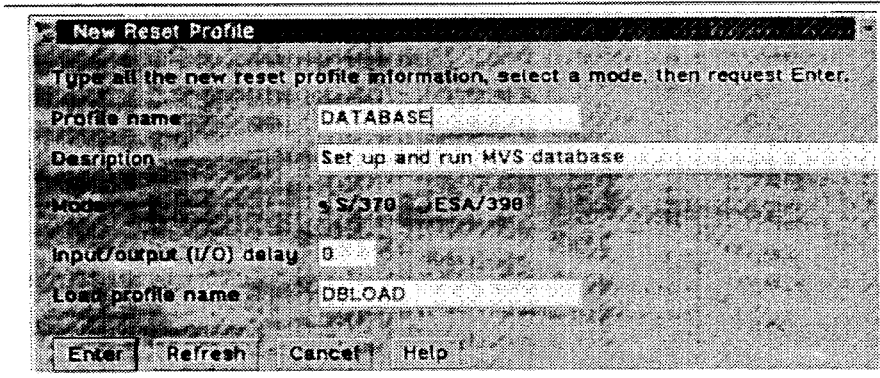
Figure 6:
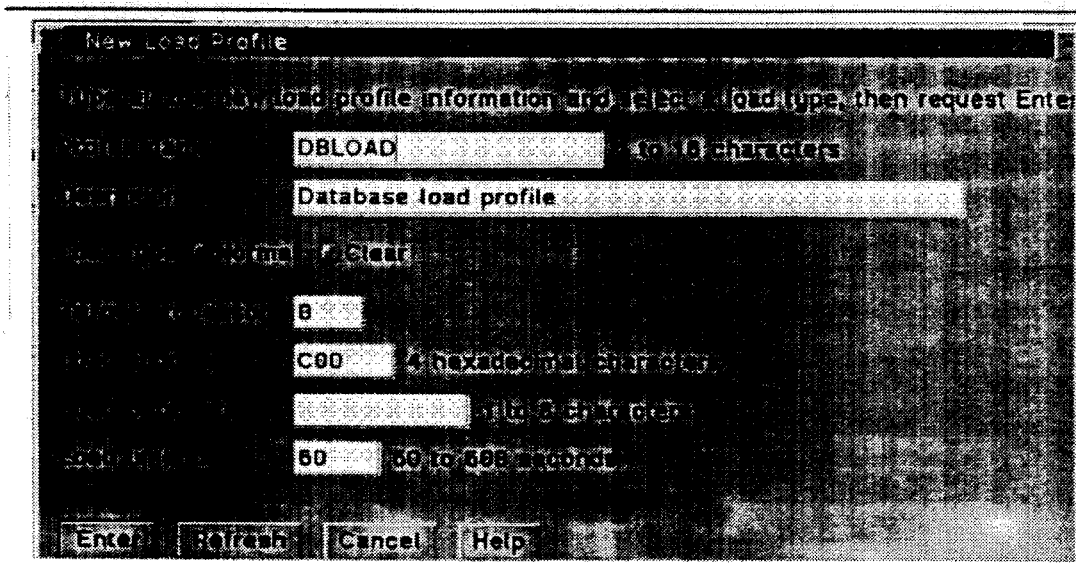

Next, the user begins a procedure to define activation profiles for each of the CECs, i.e. one or more modes of powering-on, IMLing and IPLing each CEC. To this end, the user selects the Hardware icon (step 110), and in response, the console program displays a screen of FIG. 4 in which all functional CECs in the system are shown, each CEC being represented by an icon and a name beneath the icon (step 112). Next, the user selects a CEC and then a Customize Profiles action 116 (step 118). (Selections are preferably made by selecting and dragging the CEC and "dropping" it on the Customize Profiles action with the mouse 56.) In response, the console program displays the screen of FIG. 5 to enable the user to define a power-on and IML profile (step 120), and the user fills-in a profile name "Database", description, a System/370 or ESA/390 power-on and IML mode, a delay time to permit associated I/O devices to power-on, and a load profile name (step 122). The power-on and IML mode determines which set of hardware components (S/370 for System/370 mode and ESA/390 for Extended System Architecture/390 mode) in addition to the processor should be powered-on and which microcode (System/370 or ES/9000) should be loaded. The load profile name identifies a load profile which will be defined next to indicate an operating system program for the subsequent IPL. By the user filling in the load profile name, this links the power-on and IML profile to the load profile. After the user enters the foregoing data, the console program stores it in a Database profile file (step 124) and then displays the screen of FIG. 6 to permit the user to define the load profile (another iteration of step 120). Then, the user fills-in a profile name "Dbload", description, a load type ("normal" to not reset memory and "clear" to reset memory), a target processor on which to load the operating system, a memory address of the desired operating system (for example, MVS operating system), a load parameter to define the operating system load nucleus, and a load time-out allowed for a load to complete before assuming failure (another iteration of step 122). The console program stores this data in a Dbload file (another iteration of step 124). In the foregoing example, the two profiles are used for a data base environment in which the processor is used to manage a data base.

Figure 7:
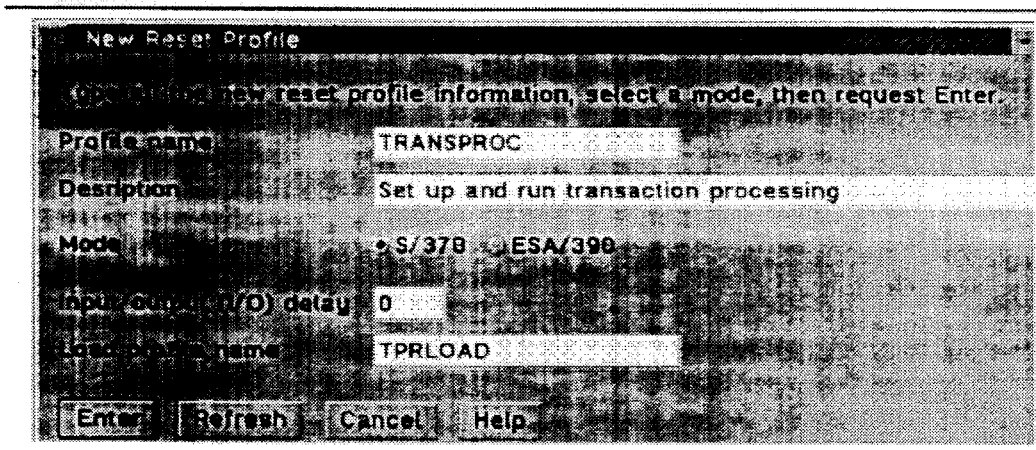
Figure 8:
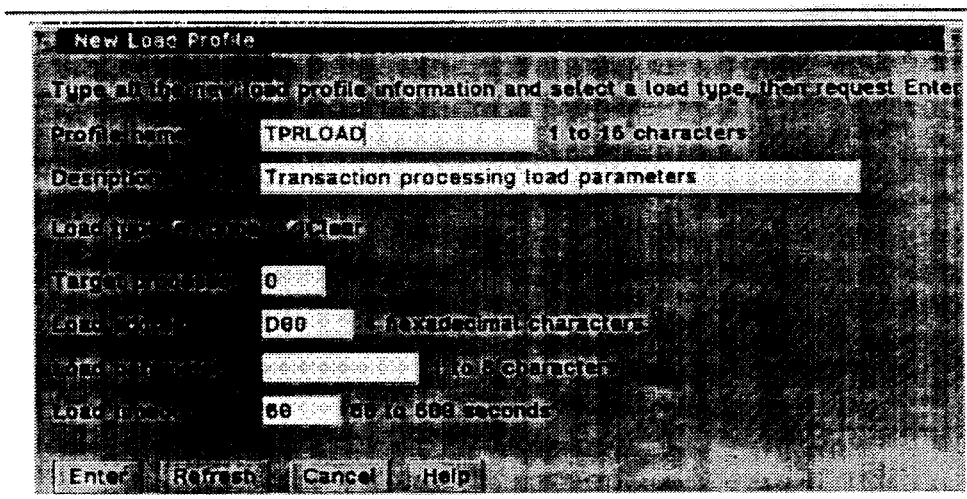

Next, in a manner similar to steps 122 and 124, the user defines another power-on/IML profile using the screen of FIG. 7 to be stored in a "Transproc" file and respective IPL profile using the screen of FIG. 8 to be stored in a "Tprload" file. These latter two profiles are used for a transaction processing environment (two iterations of steps 132 and 134).

Next, in the illustrated example, the user links the Database and Transproc (and indirectly the Dbload and Tprload) profiles to files within the console for all thirty two CECS by typing the load profile name in the power-on and IML profile (step 136 and 140); however, if desired, the user could have defined different or additional profiles for any or all of the CECs by additional iterations of steps 122 and 124 or steps 132 and 134. After all of the profiles are defined and linked, the console program 58 sends the profiles to the respective CECs for storage there (step 144). Each of the CECs will subsequently use one pair of these profiles when commanded to activate by the user via the group command program 66.

Figure 9:
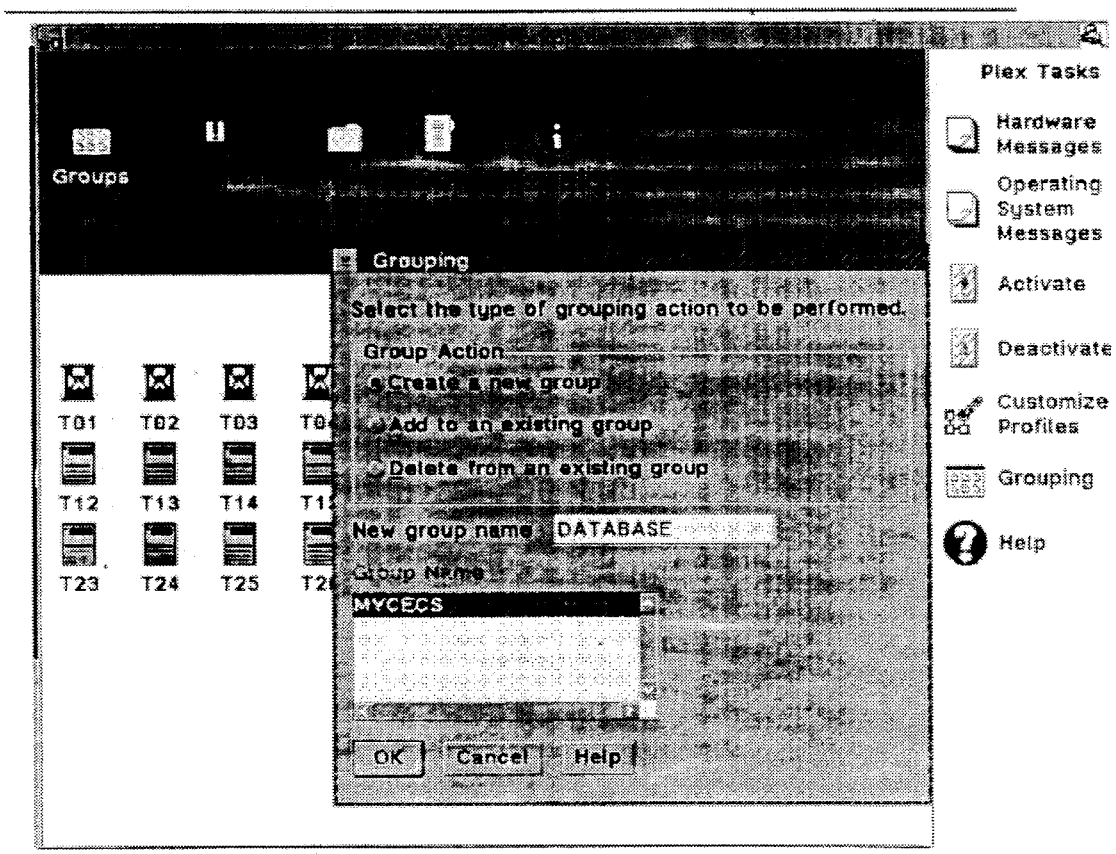

Next, the user proceeds to define one or more groups of the CECs 36a,b,c,n as follows so the user can subsequently command action on all CECs in each group in one step, and so the user can receive group status information. In step 200, the user selects the Hardware icon to obtain the screen of FIG. 4 again. Then, the user selects CECs T01–T04 with single clicks by the mouse, and in response, the console program highlights each of the selected CECs. Then, the user "drags" CECs T01–T04 to a Grouping icon 202 by placing the mouse pointer over one of the four selected CECs, pressing and holding the right mouse button, then dragging the mouse pointer over to the Grouping icon and then releasing the right mouse button (step 200). The prior art OS/2 program provides the "dragging" function and this is performed by the OS/2 program as described above. In response, the console program displays a Grouping definition window of FIG. 9 (step 206), and the user selects a Create A New Group option and fills-in a group name Database (step 208). Then, the console establishes a Database Group file containing the names of CECs T01–T04 (step 210). Note that two pairs of activation profiles were previously defined for each of the CECs and are still defined for each of the CECs.

Next, the user selects CECs T03–T07 and drags them to the Grouping icon to define a Transproc group and the console establishes a "Transproc" group file containing the names of CECs T03–T07 (steps 220, 226, 228 and 230) in a similar manner as in steps 200, 206, 208 and 210, respectively.

Figure 11:
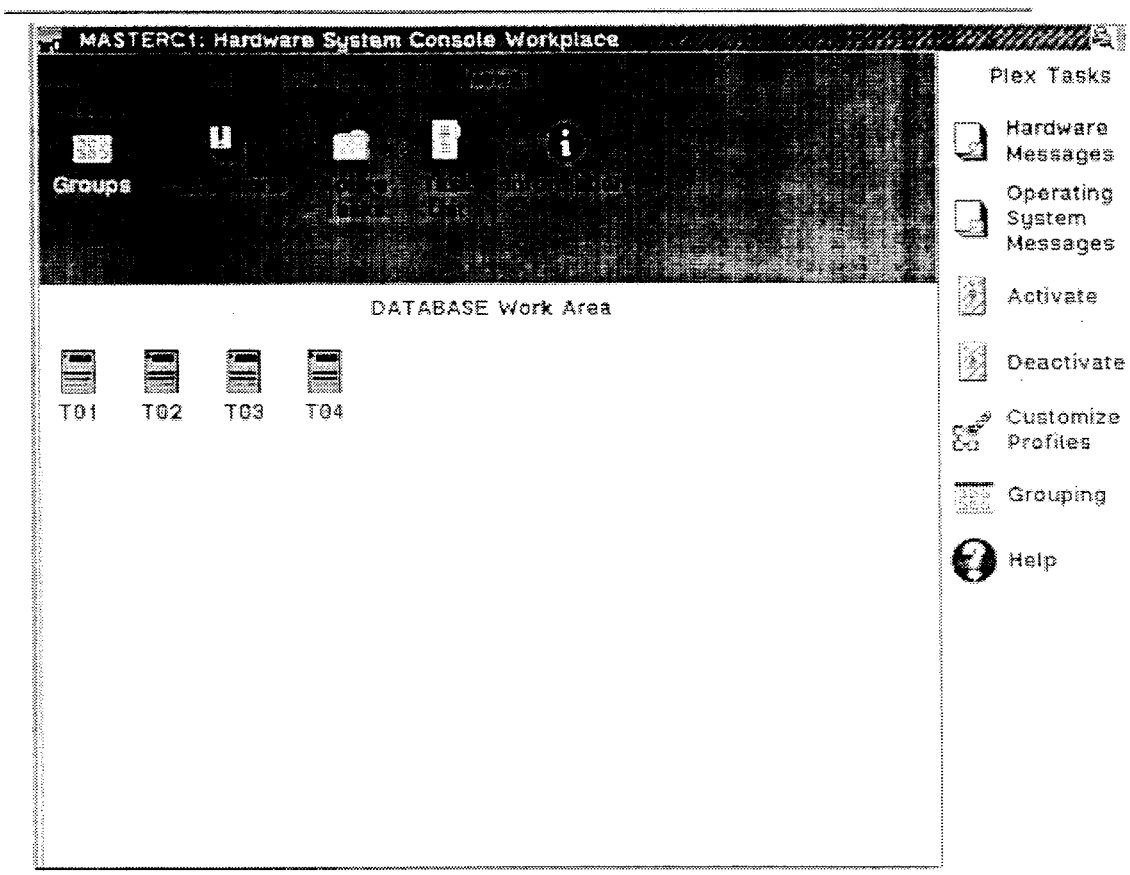
Figure 12:
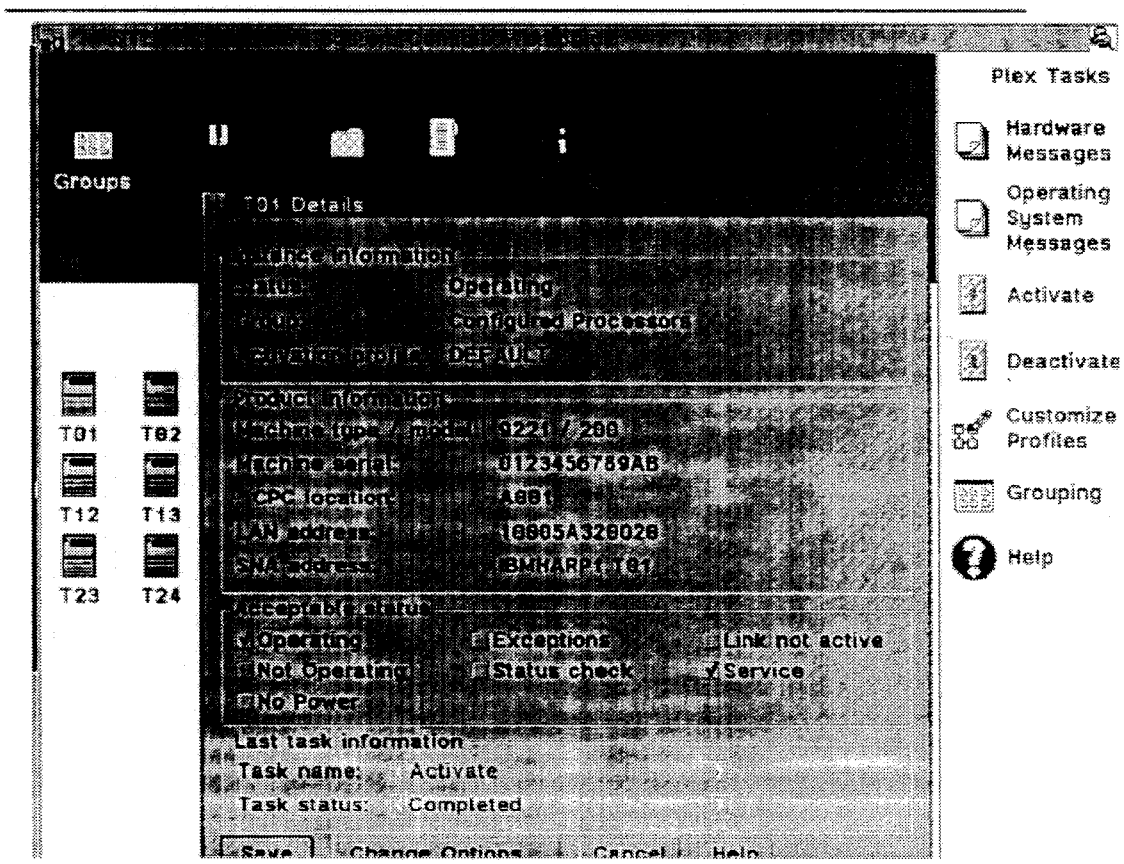
Figure 13:
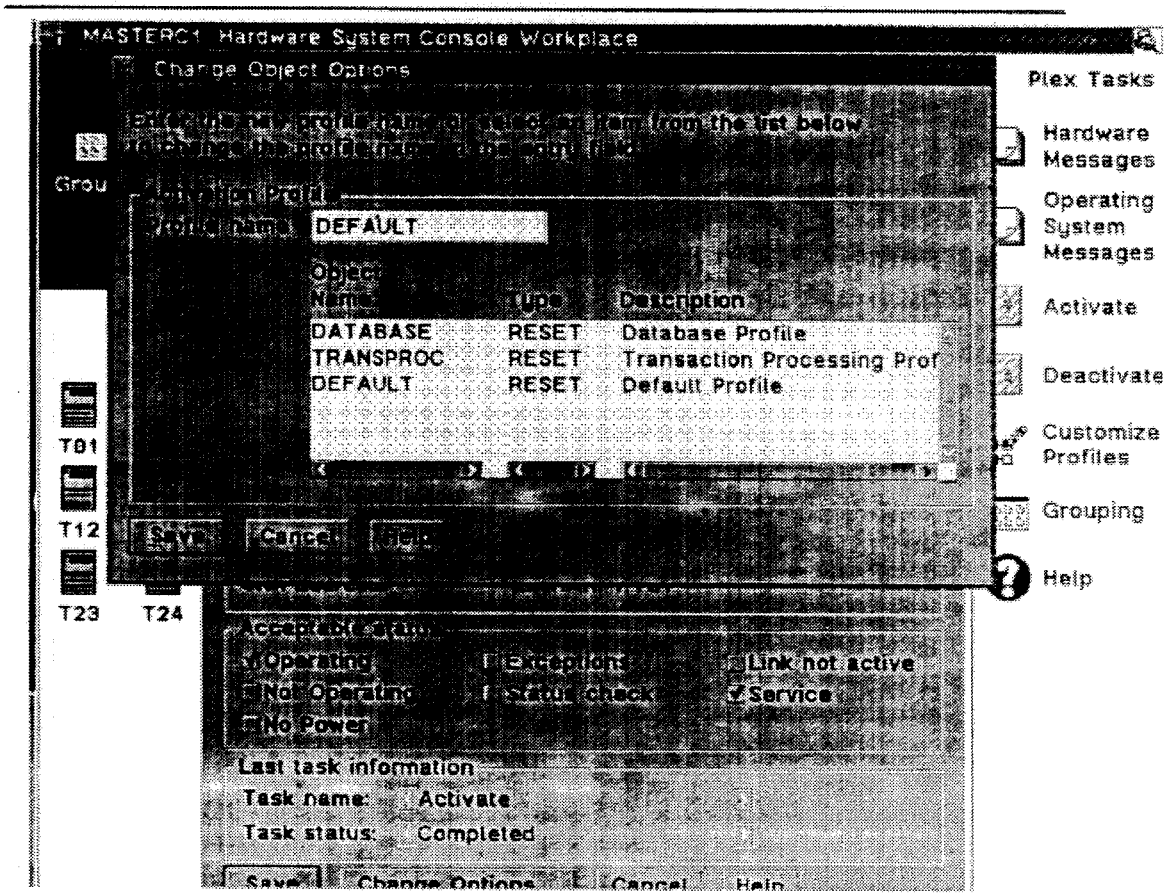

Because two pairs of activation profiles have been defined for each CEC, the user now begins a procedure to indicate which of the two pairs of activation profiles should be used for each CEC when the group which contains the CEC is activated. In step 240, the user selects the Groups icon from the screen of FIG. 4, and in response, the console program displays a screen of FIG. 10 which illustrates the Hardware icon, a Database icon and a Transproc icon. As defined above, the Database icon represents CECs T01–T04 and the Transproc icon represents CECs T03–T07. Next, the user selects the Database icon (step 242), and in response, the console program displays a screen of FIG. 11 which shows the CECs T01–T04 of the Database group (step 244). Next, the user selects CEC T01 from the Database group (step 246), and in response, the console program displays a Details screen of FIG. 12 which shows default parameters for CEC T01 including a default activation profile name (step 248). Next, the user selects Change Options (step 250), and in response, the console program displays a Change Object Options screen of FIG. 13 (step 252). Next, the user selects the Database profile name and a Save option (step 254), and in response, the console program saves the Database activation profile name as an attribute for CEC T01; this attribute is applicable when CEC T01 is activated as part of the Database group (step 256). The user repeats steps 246–256 three times to save the Database activation profile name for CECs T02–T04 within the Database group (three iterations of steps 258 and 260). Next, the user repeats steps 242–260 for the CECs of the Transproc group to designate the Transproc activation file, and the result is that the console program saves the Transproc activation profile name as an attribute for CECs T03–T08 when activated as part of the Transproc group (steps 272–290). At this point, the two groups have been fully defined and set up with the respective activation profile for each CEC in the group.

Figure 14:
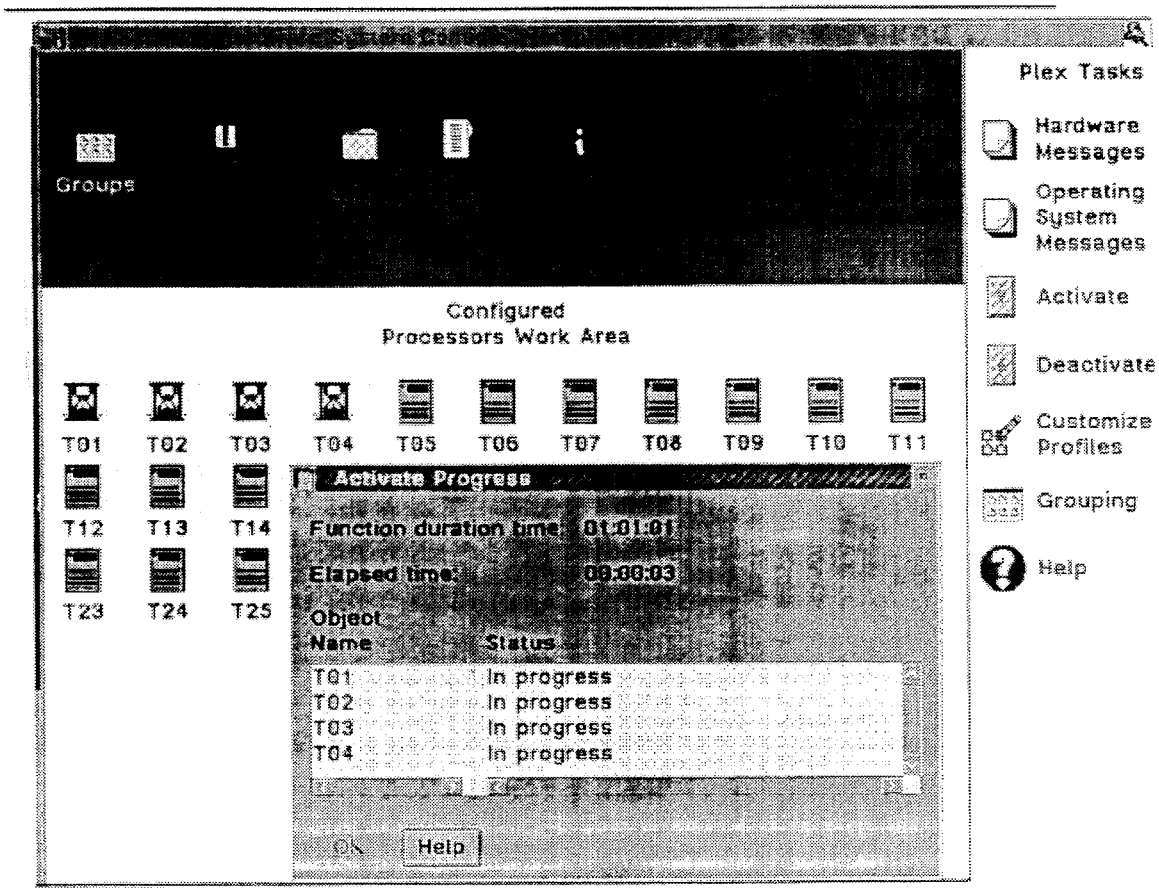
Figure 15:
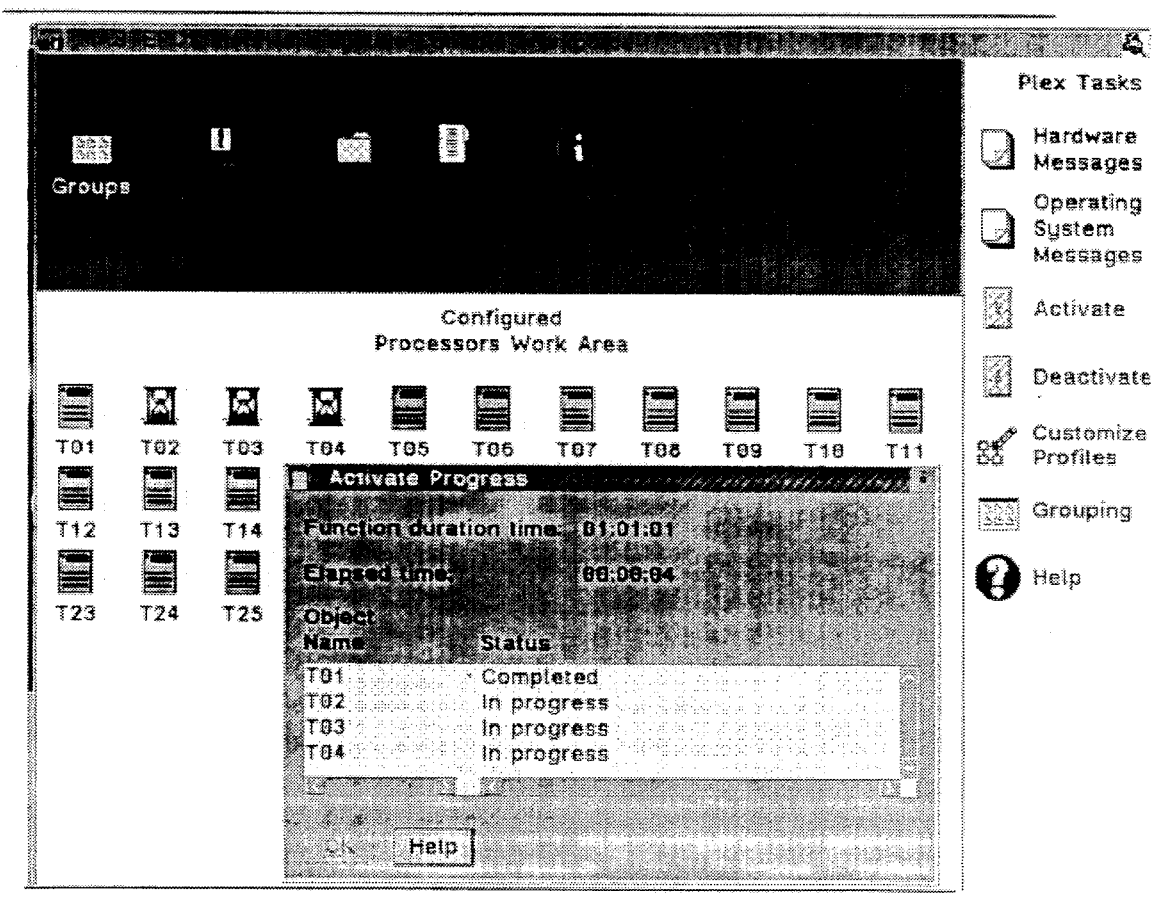
Figure 16:
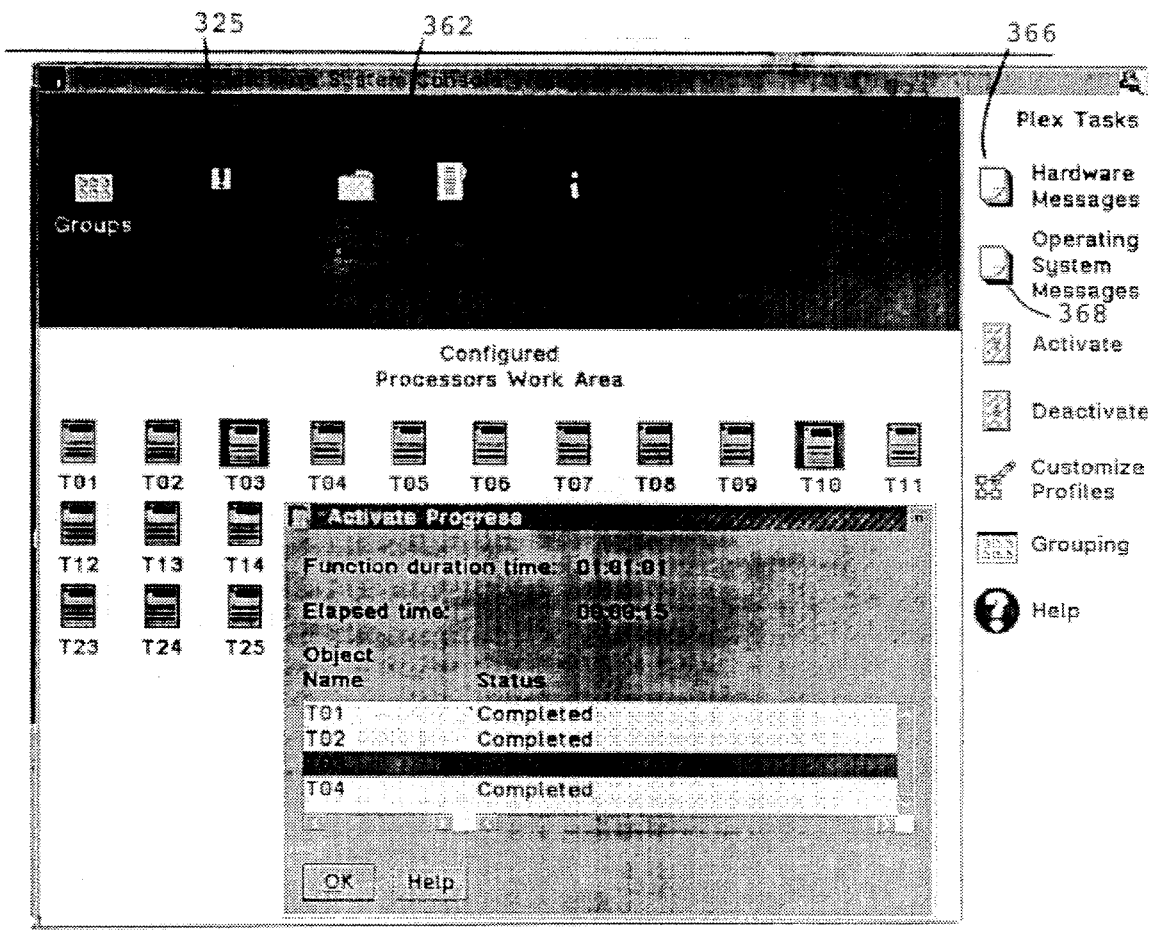

Next, the user proceeds to activate the CECs T01–T04 of the Database group by means of the Database icon as follows. In step 300, the user selects the Groups icon from the display of FIG. 3 to elicit the display of FIG. 10. Then, the user drags the Database icon to the Activate icon. In response, the group command program 66 reads the Database group file to determine which CECs are contained within the Database group and which activation profile is applicable for these CECs when part of the Database group (step 302). Also, the group command program sends an activate request and the proper activation profile name to each CEC in the Database group (step 302). In the foregoing example, the Database group contains CECs T01–T04 and the proper activation profile is the Database activation profile. Also in response to the dragging of the Database group icon to the Activate icon, the console program displays a screen of FIG. 14 with a window listing each CEC in the Database group and its "in progress" status, and a busy indicator in the form of an hour glass in place of the icons for CECs T01–T04 (step 304). The window can be minimized and stored in an Active file which is accessible by an Active icon 305. While the CECs T01–T04 are busy being activated, no other group which contains any of the CECs T01–T04 can be acted upon. (Thus, the Transproc group is also busy now and cannot be acted upon because the Transproc group includes CECs T03 and T04.) Meanwhile, the activate function 38 within each of the CECs T01–T04 reads the Database activation profile and linked Dbload activation profile and attempts to activate the respective CEC based on the parameters in the Database and Dbload activation profiles, i.e. attempts to power-on, IML and IPL according to the Database and Dbload activation profiles. The manner of physical activation is described in U.S. patent application Ser. No. 07/577,969, filed by B. E. Casey et al. on Sep. 4, 1990, which patent application is hereby incorporated by reference as part of the present disclosure. After the attempt at activation is completed, the status monitor 40 within each CEC in the Database group sends the current status to the status update program 60 in the console (step 306). In response, the status update program updates the displayed status field and also replaces the hour glass of each activated CEC with the CEC icon as illustrated in FIGS. 15 and 16 (step 310). FIG. 15 illustrates that activation of CEC T01 has successfully completed and subsequent FIG. 16 illustrates that activation of CECs T02 and T04 has also successfully completed but CEC T03 failed to activate within the predetermined time limit.

Also, as illustrated in FIG. 16, the console program reviews the status of each CEC in the Database group, and if any did not successfully activate (decision 320 and step 321), the console program highlights (for example, in red) the failed CEC icon (in this case CEC T03), the row listing CEC T03 and the Views background for the system generated icons at the top of FIG. 16 (step 322). Also, at this time, the console program stores the name of CEC T03 into an Exceptions file for future reference by the user (step 322). The Exceptions file can be accessed by an Exceptions icon 325. At this time, all the hour glass/busy icons are replaced by the CEC icons, even the hour glass/busy icon for CEC T03 (step 326).

Next, the status update program 60 requests the status of all thirty two CECs (step 340), and all status monitor programs 40a,b,c,n determine and report back the respective status of the 32 CECs (step 342). System and User groups are populated with CECs that have configured status, i.e. are functional (step 344). Then, the console program removes the "Activate Progress" window, and highlights in red all CECs that have failed to activate upon request, in this case CEC T03 only (which is already highlighted) (step 346). Even though CECs T05–T32 may not be active at this time, this would not be considered a failure unless they were requested to activate. The console program continues to highlight the Views background for the system defined icons at the top of the screen (step 347). The status update program stores other data so that if the user now selects the Groups icon, then the console program displays the screen of FIG. 10 and highlights (for example, in red) all group icons that contain any failed CEC (step 350). In the illustrated example, only CEC T03 has failed so the console program highlights both the Database and Transproc group icons. Also, the console program stores in the Exceptions file the name of any other failed CECs (step 352).

If CEC T03 becomes active later due to the problem being resolved, then the console program will remove the highlight of the Database group icon and the Transproc group icon, and remove CEC T03 from the Exceptions file.

The following are additional features of the console program 58. After receipt of the status reports sent in step 342, the console program also highlights in a different color in the screen of FIG. 16 (without the Activate Progress window), any CECs that have messages pending (hardware error messages or operating system messages) (step 360). In the illustrated example, CEC T10 has a message pending from the hardware. This highlight for the pending messages is vertically (or horizontally) offset from the highlight for the failure so the display of a single CEC can exhibit both highlights simultaneously. If one or more CECs have a hardware or operating system message waiting, a Task icon 362 will also display the message waiting color and flash (step 364). Also, a Hardware Messages icon 366 or an Operating System Messages icon 368 will flash. Also, the console program will highlight, using the messages waiting color, all groups that contain any CEC for which a message is waiting (step 370). This highlight for the pending messages is vertically or horizontally offset from the highlight for the failure so the display of a single group icon can exhibit both highlights simultaneously.

Figure 10:
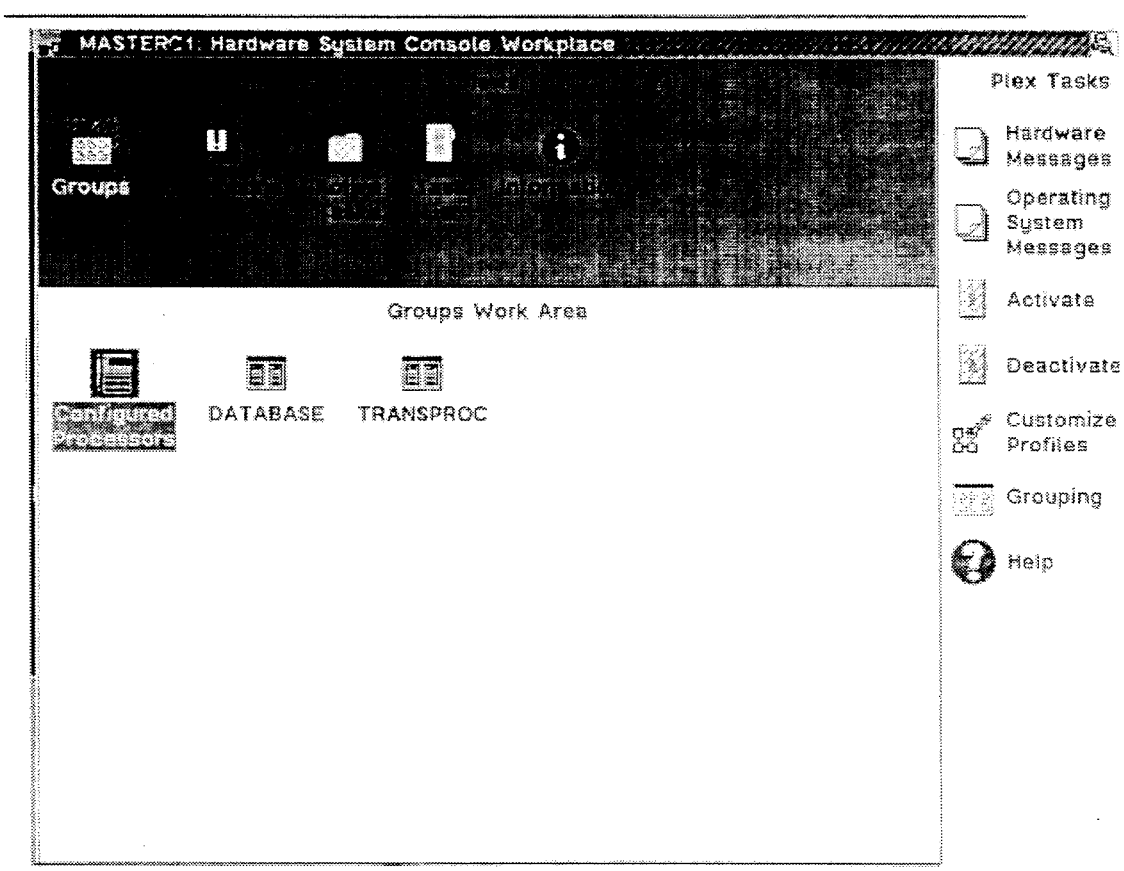

In the illustrated example, the user next requests activation of the Transproc group using the screen of FIG. 10 by "dragging" the Transproc group icon to the Activate icon (step 400). In response, the group command program reads the Transproc file to determine that the Transproc group contains CECs T03–T07 and the Transproc activation profile should be used, and then sends the activation request and the Transproc activation file name to CECs T03–T07 (step 402). The console program displays an hour glass busy signal for CECs T03–T07 (step 403) in the same manner previously described for CECs T01–T04 in FIG. 14. In response to the activation requests, the activate function 38 at each CEC within the Transproc group attempts to activate the CEC according to the parameters in the Transproc and linked Tprload activation files (step 404). Then, the status monitor program within each CEC of the Transproc group reports status to the status update program 60 within the console (step 406), and the status update program updates the status of each of CECs T03–T07 (step 410). Steps 420, 421, 422 and 426 are similar to steps 320, 321, 322 and 326, respectively, except for the contents of the respective group. Next, the status update program requests status of all the CECs (step 440), and the status monitor programs respond (step 442). Steps 444, 446, 447, 450, 452, 460, 464, and 470 are similar to steps 344, 346, 347, 350, 352, 360, 364 and 370, respectively, except for the contents of the respective group.

In the illustrated example, the user next requests deactivation of the Database group using the screen of FIG. 10 by "dragging" the Database group icon to the Deactivate icon (step 500). In response, the group command program reads the Database file to determine that the Database group contains CECs T01–T04 and that the Database activation profile applies; the subsequent deactivation process will use the information in the activation profile also. Then, the group command program sends the deactivation request and the Database activation file name to CECs T01–T04 (step 502). The console program displays an hour glass busy signal for CECs T01–T04 (step 502) in the same manner previously described for CECs T01–T04 in FIG. 14 for the activate command. Because the Transproc group also contains CECs T03 and T04, the Transproc group is also busy at this time, and cannot be acted upon until CECs T03 and T04 are no longer busy. In response to the deactivation requests, the deactivate function 39 at each CEC within the Database group attempts to deactivate the CEC according to the parameters in the Database and linked Dbload activation files (step 504). The deactivation comprises the erasure or invalidation of the IML and IPL programs and then turning-off power to the CEC. Then, the status monitor program within each CEC of the Database group reports status to the status update program 60 within the console (step 506), and the status update program updates the status of each of CECs T01–T04 (step 510). Steps 520, 521, 522 and 526 are similar to steps 320, 321, 322 and 326, respectively, except for the contents of the respective group. Next, the status update program request requests status of all the CECs (step 540), and the status monitor programs respond (step 542). Steps 544, 546, 547, 550, 552, 560, 564, and 570 are similar to steps 344, 346, 347, 350, 352, 360, 364 and 370, respectively, except for the contents of the respective group. Hence, if CEC T03 fails to deactivate, then both the Database group and the Transproc group are highlighted.

Next, in the illustrated example, the communication hardware in CEC T03 now reports a complete failure (step 604). The status update program 60 receives the report, and then determines if the failed CEC was active at the time of the last status report (decision 606). In the illustrated example, CEC T03 was not active at that time and so, the console program deletes CEC T03 from the display of FIG. 4 which then illustrates all other CECs (step 606). Also, the console program deletes CEC T03 from both the Database group and the Transproc group. Consequently, if the Database group is subsequently selected only CECs T01, T02 and T04 will be displayed and if the Transproc group is subsequently selected only CECs T04–T07 will be displayed. Also, if CEC T03 is currently listed in the Exceptions file, then it is deleted there. Referring back to step 606, if CEC T03 were instead listed as active at the time of the previous status check, then it would appear in all the groups it was defined to be in and would behave as previously described if it had an error and/or a message.

Later, in the illustrated example, the user (or a service person) fixes CEC T03 and manually powers-up, IMLs and IPLs CEC T03 (step 630). Then, CEC T03 sends its status to the status update program 60 (step 632), and the console program updates the status of CEC T03 to active, adds CEC T03 to the display of FIG. 4 and adds CEC T03 back to the Database and Transproc groups (step 650). If there is some other problem with CEC T03 that the user previously defined as being unacceptable, the CEC T03 would also be listed in the Exceptions file Step (650).

Based on the foregoing, a console according to the present invention has been disclosed. However, numerous modifications and substitutions can be made without deviating from the scope of the present invention. For example, objects representing I/O (Channels, Control Units and Devices) or computer, software, or application objects could be displayed and appropriate actions provided in a task list. Therefore, the invention has been disclosed by way of illustration and not limitation, and reference should be made to the following claims to determine the scope of the present invention.

We claim:

1. A console for operating a computer which includes a multiplicity of processors, said console comprising:

means for displaying an activate icon, a grouping icon and a multiplicity of icons which represent said multiplicity of processors, respectively;

means for defining a group of said processors based on user selection of two or more of the processor icons and said grouping icon;

means, responsive to the defining means, for displaying a group icon which represents said group of processors means for requesting activation of said group of processors by selecting said group icon and said activate icon; and means, responsive to the requesting means, for activating said group of processors; and wherein said means for displaying said group icon display said group icon after said activation of said group of processors without said group being redefined.

2. A console as set forth in claim 1 wherein the group defining means is operated by dragging said two or more processor icons to said grouping icon.

3. A console as set forth in claim 2 wherein the requesting means is operated by dragging said group icon to said activate icon.

4. A console for operating a computer which includes a multiplicity of processors, said console comprising:

means for displaying a multiplicity of icons which represent said multiplicity of processors, respectively;

means for defining first and second groups of said processors, and in response, the displaying means displays first and second group icons which represent said first and second groups of processors, respectively, said first and second groups comprising a common processor, said first group also comprising a processor not contained in said second group and said second group also comprising processor not contained in said first group;

means for requesting activation of said first group of processors; and means, responsive to the requesting means, for attempting to activate said first group of processors; and wherein if said common processor fails to activate when said attempting means attempts to activate said first group of processors, the displaying means modifies both of the displayed first and second group icons to indicate that at least one processor in each of said first and second groups has failed to activate.

5. A console as set forth in claim 4 further comprising:

means for displaying and storing information that said processors of said first group are busy while the attempting means attempts to activate said processors of said first group; and means, coupled to the information storing means, for preventing an attempt at activating said second group of processors as long as said common processor is busy.

6. A console as set forth in claim 4 wherein said displaying means so modifies both of said displayed first and second group icons by highlighting both of said first and second group icons.

7. A method for operating a computer which includes a multiplicity of processors, said method comprising the steps of:

displaying an activate icon, a grouping icon and a multiplicity of icons which represent said multiplicity of processors, respectively;

defining a group of said processors based on user selection of two or more of the processor icons and said grouping icon, and in response, displaying a group icon which represents said group of processors;

requesting activation of said group of processors by selecting said group icon and said activate icon, and in response, activating said group of processors; and displaying said group icon after said activation of said group of processors without said group being redefined.

8. A method as set forth in claim 7 wherein the step of defining said group of processors comprises the step of dragging said two or more processor icons to said grouping icon.

9. A method as set forth in claim 8 wherein the step of requesting activation comprises the step of dragging said group icon to said activate icon.

10. A method for activating processors, said method comprising the steps of:

displaying a multiplicity of first icons representing respective processors, a second icon representing a grouping operation and a third icon representing an activate operation;

user selecting a plurality of said first icons and said second icon, and in response, displaying a fourth icon representing processors corresponding to said plurality of first icons;

user selecting said fourth icon and said third icon, and in response, activating the processors represented by said fourth icon; and displaying said fourth icon after said activating step without said plurality and said second icon being reselected.

* * * * *